United States Patent
Pi

(10) Patent No.: US 9,379,957 B1
(45) Date of Patent: Jun. 28, 2016

(54) MULTI-LEVEL AGER RINGS FOR TRACKING SESSION LIFE CYCLE

(71) Applicant: Juniper Networks, Inc., Sunnyvale, CA (US)

(72) Inventor: Jianwen K. Pi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 197 days.

(21) Appl. No.: 14/309,125

(22) Filed: Jun. 19, 2014

(51) Int. Cl.
*G06F 15/173* (2006.01)
*H04L 12/26* (2006.01)

(52) U.S. Cl.
CPC ...................................... *H04L 43/16* (2013.01)

(58) Field of Classification Search
CPC ..... H01L 67/14; H01L 67/143; H01L 67/145; H01L 69/28; G06F 9/5022
USPC .......................................................... 709/224
See application file for complete search history.

(56) References Cited

U.S. PATENT DOCUMENTS

| 7,716,380 | B1* | 5/2010 | Wang | H04L 67/14 370/452 |
| 8,069,268 | B2* | 11/2011 | Wang | H04L 67/14 370/452 |
| 8,140,656 | B2 | 3/2012 | Chen et al. | |
| 2010/0180026 | A1* | 7/2010 | Wang | H04L 67/14 709/224 |
| 2011/0238804 | A1* | 9/2011 | Chen | G06F 9/5022 709/223 |
| 2012/0144012 | A1* | 6/2012 | Chen | G06F 9/5022 709/223 |

* cited by examiner

*Primary Examiner* — Kostas Katsikis
(74) *Attorney, Agent, or Firm* — Harrity & Harrity, LLP

(57) ABSTRACT

A device may determine a session life cycle associated with a communication session. The session life cycle may indicate a time period associated with expiration of the communication session. The device may compare the session life cycle and a threshold value, and may determine that the session life cycle satisfies the threshold value based on comparing the session life cycle and the threshold value. The device may initialize multiple ager rings based on determining that the session life cycle satisfies the threshold value. The multiple ager rings may be used to monitor the expiration of the communication session. The device may monitor the expiration of the communication session using the multiple ager rings.

20 Claims, 21 Drawing Sheets

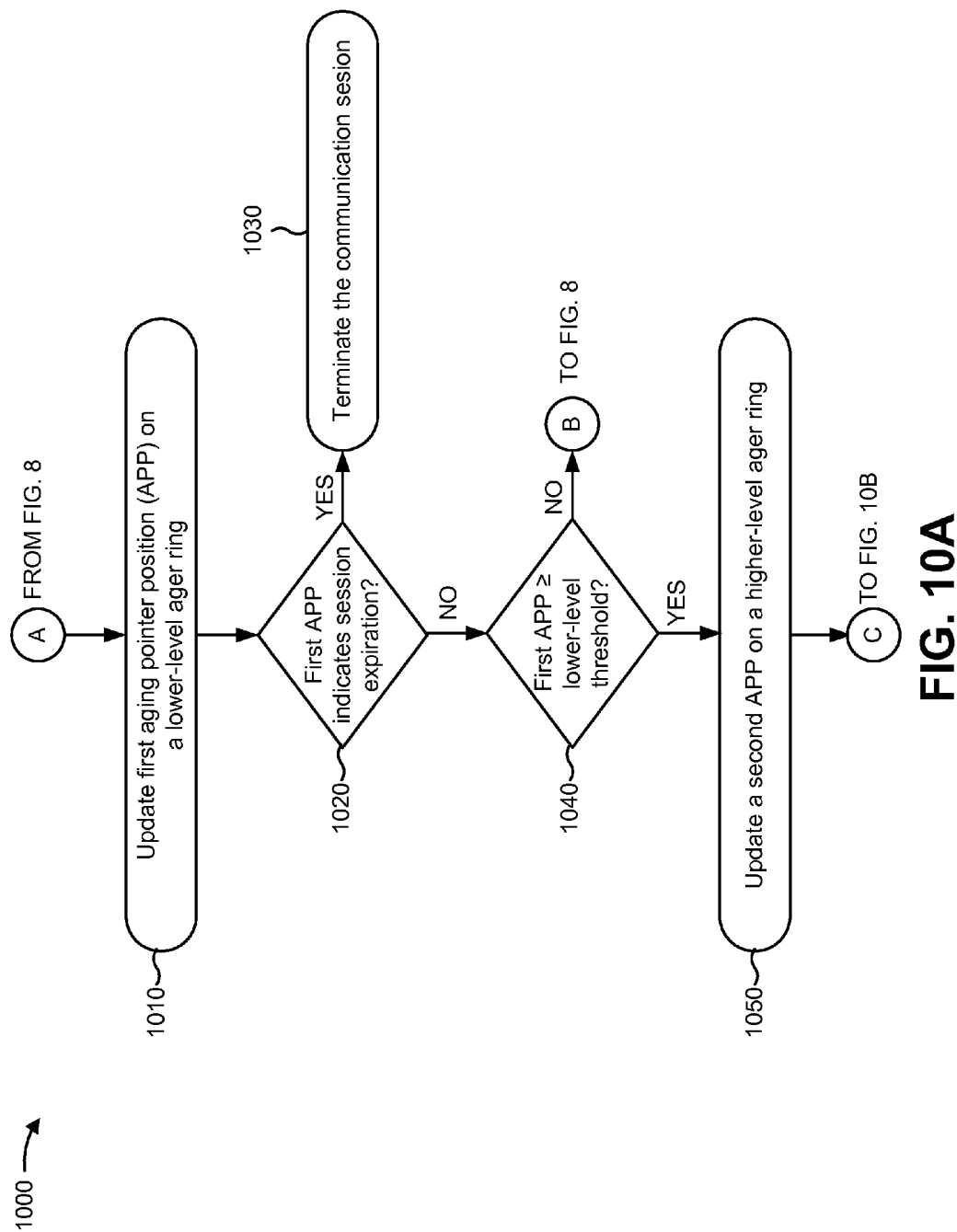

MULTI-LEVEL AGER RINGS FOR TRACKING SESSION LIFE CYCLE

BACKGROUND

Computing and communication networks may include network devices, such as routers, firewalls, switches, servers, gateways, etc., which transfer or switch data, such as packets, from one or more sources to one or more destinations. Network devices may operate on the packets as the packets traverse the network, such as by forwarding or filtering the packet-based network traffic.

A session may refer to a semi-permanent interactive information interchange between two or more communicating devices. A session may be set up at a first point in time, and may be torn down at a later point in time when the session expires. A network device may manage expirations associated with sessions. When a time period or life cycle associated with a session expires, the network device may tear down the session.

SUMMARY

According to some possible implementations, a device may detect a communication session, and may determine a session life cycle associated with the communication session. The session life cycle may indicate a time period after which the communication session is to be terminated. The device may determine whether the session life cycle satisfies a threshold. The device may selectively perform a first action or a second action based on determining whether the session life cycle satisfies the threshold. The first action may include monitoring expiration of the communication session using a single ager ring when the session life cycle does not satisfy the threshold. The second action may include monitoring expiration of the communication session using multiple ager rings when the session life cycle satisfies the threshold.

According to some possible implementations, a computer-readable medium may store instructions. The instructions, when executed by a processor, may cause the processor to determine a session life cycle associated with a communication session. The session life cycle may indicate a time period associated with expiration of the communication session. The instructions may cause the processor to compare the session life cycle and a threshold value, and to determine that the session life cycle satisfies the threshold value based on comparing the session life cycle and the threshold value. The instructions may cause the processor to initialize multiple ager rings based on determining that the session life cycle satisfies the threshold value. The multiple ager rings may be used to monitor the expiration of the communication session. The instructions may cause the processor to monitor the expiration of the communication session using the multiple ager rings.

According to some possible implementations, a method may include determining, by a device, a session life cycle associated with a communication session. The session life cycle may identify a session time period associated with expiration of the communication session. The method may include comparing, by the device, the session time period and a threshold time period associated with a lower-level ager ring. The lower-level ager ring may be used to monitor the expiration of the communication session. The method may include determining, by the device, that the session time period satisfies the threshold time period based on comparing the session time period and the threshold time period. The method may include initializing, by the device, multiple ager rings based on determining that the session time period satisfies the threshold time period. The multiple ager rings may include the lower-level ager ring and a higher-level ager ring. The method may include monitoring, by the device, the expiration of the communication session using the multiple ager rings.

BRIEF DESCRIPTION OF THE DRAWINGS

FIGS. 10A and 10B are flow charts of an example process for updating an ager ring when an aging event is detected;

DETAILED DESCRIPTION

The following detailed description of example implementations refers to the accompanying drawings. The same reference numbers in different drawings may identify the same or similar elements.

A network device, such as a firewall, a security device, or the like, may utilize a ring-based aging mechanism, or an "ager ring," to manage session expirations. The network device may use the ager ring to monitor session communications to determine whether a time period associated with the session has expired. When a time period associated with a session expires, the network device may tear down the session. Computing resources of the network device, such as memory, may be reserved to implement an ager ring, and an amount of computing resources required to implement an ager ring may depend on the size of the ager ring. A size of an ager ring may correspond to a life cycle of a session (e.g., a time period associated with session expiration). For example, a larger ager ring may be used for a longer session life cycle, and a smaller ager ring may be used for a shorter session life cycle. However, different sessions may be associated with different life cycle lengths, and computing resources may be wasted when a large ager ring is used for a session with a short life cycle. Implementations described herein conserve computing resources by using ager rings of different sizes (e.g., multi-level ager rings) for sessions with different life cycles.

Figure 1:
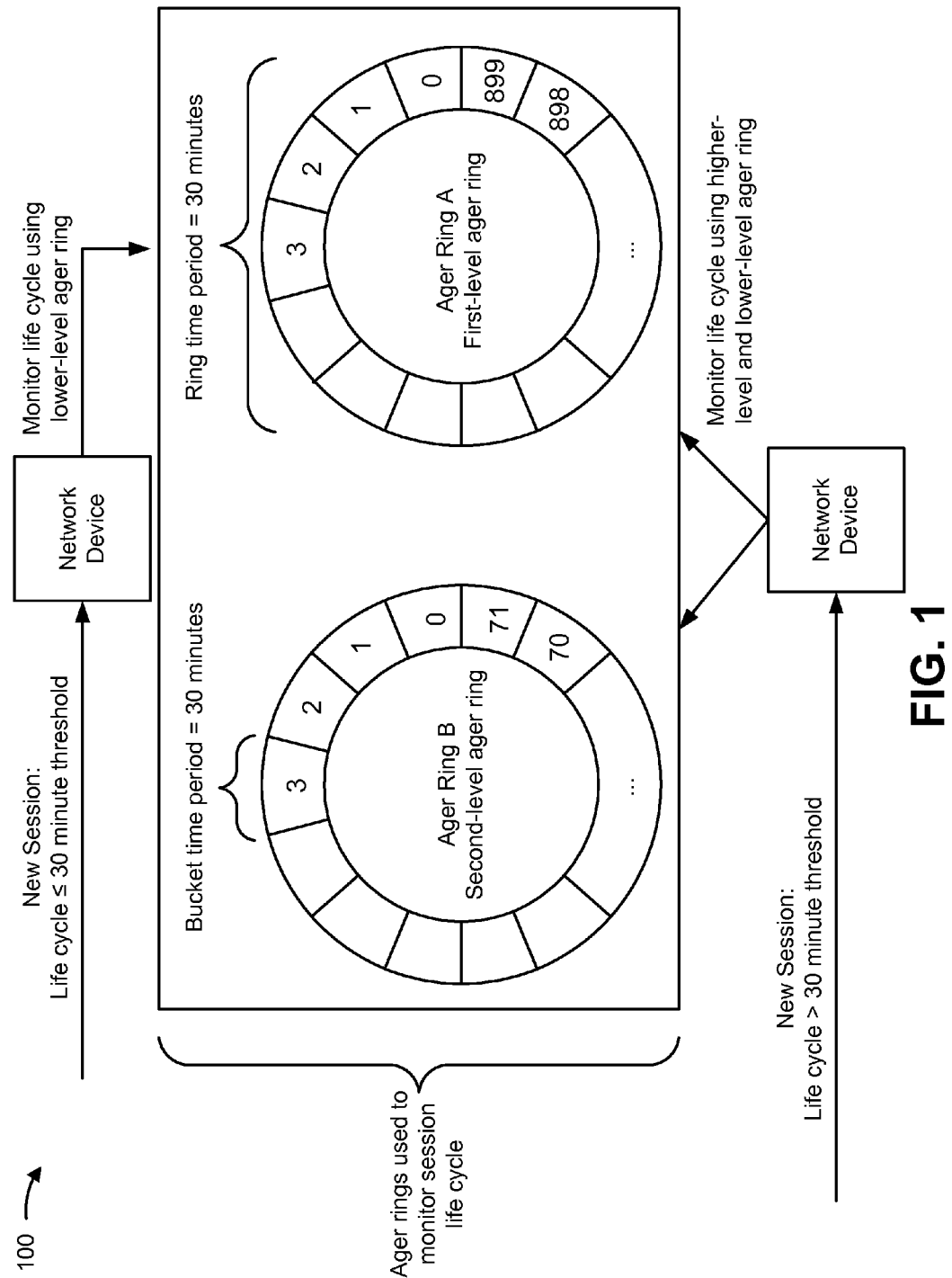
FIG. 1 is a diagram of an overview of an example implementation described herein.

FIG. 1 is a diagram of an overview of an example implementation 100 described herein. As shown in FIG. 1, a network device (e.g., a firewall, a router, a gateway, etc.) may configure multi-level ager rings to monitor sessions associated with life cycles of different lengths. For example, "Ager Ring A" may be used to monitor sessions with a life cycle of 30 minutes or less, and "Ager Ring B" may be used (e.g., in addition to "Ager Ring A") to monitor sessions with a life cycle greater than 30 minutes.

As further shown in FIG. 1, when the network device establishes a new session, the network device may determine a life cycle associated with the session, and may compare the life cycle to a time period (e.g., 30 minutes) measured by a lower-level ager ring (e.g., Ager Ring A). If the life cycle is less than or equal to the time period measured by the lower-level ager ring, then the network device may use the lower-level ager ring to monitor expiration of the session. If the life cycle is greater than the time period measured by the lower-level ager ring, then the network device may use a higher-level ager ring (e.g., Ager Ring B) and the lower-level ager ring (e.g., Ager Ring A) to monitor expiration of the session.

The network device may configure the ager rings with a particular quantity of time buckets used to measure the passage of time. When multiple ager rings are used (e.g., a lower-level ager ring and a higher-level ager ring), the network device may configure the ager rings such that the amount of time to complete one revolution through all of the time buckets of a lower-level ager ring (e.g., 30 minutes for Ager Ring A) is equal to the amount of time to move from a first time bucket to a second time bucket in a higher-level ager ring (e.g., Ager Ring B). In this way, the network device may conserve resources by using a single ager ring (e.g., which consumes less memory) for sessions with a shorter lifecycle, and using multiple ager rings for sessions with a longer life cycle.

Figure 2:
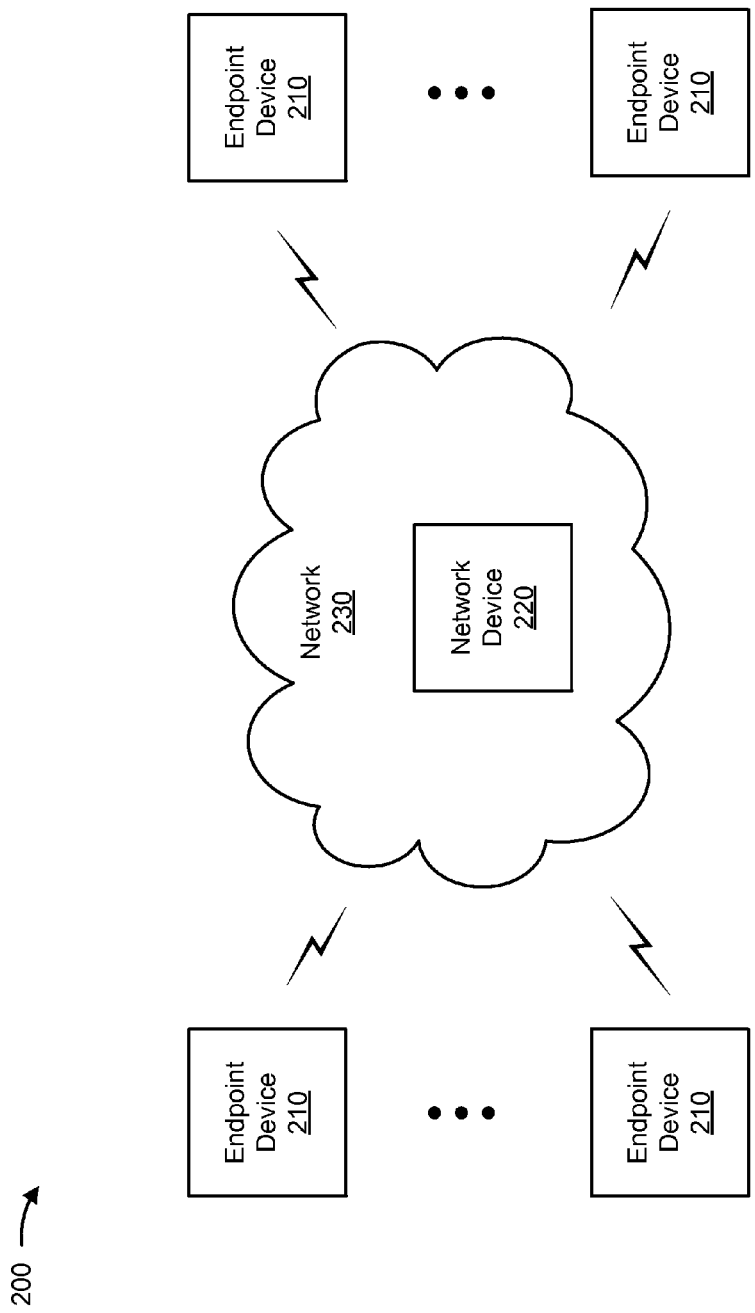
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of endpoint devices 210, a network device 220, and a network 230. Devices of environment 200 may interconnect via wired connections, wireless connections, or a combination of wired and wireless connections.

Endpoint device 210 may include one or more devices capable of receiving and/or providing information over a network (e.g., network 230), and/or capable of generating, storing, and/or processing information received and/or provided over the network. For example, endpoint device 210 may include a computing device, such as a laptop computer, a tablet computer, a handheld computer, a desktop computer, a mobile phone (e.g., a smart phone, a radiotelephone, etc.), a personal digital assistant, a network device (e.g., a router, a gateway, a firewall, a hub, a bridge, etc.), or a similar device. Endpoint device 210 may act as an endpoint (e.g., a source and/or a destination) for a communication with another endpoint device 210 via network 230. For example, a first endpoint device 210 may provide information to a second endpoint device 210 (e.g., via network device 220 and/or network 230).

Network device 220 may include one or more devices (e.g., one or more traffic transfer devices) capable of processing and/or transferring traffic between endpoint devices 210. For example, network device 220 may include a firewall, a router, a gateway, a switch, a hub, a bridge, a reverse proxy, a server (e.g., a proxy server), a security device, an intrusion detection device, a load balancer, or a similar device. Network device 220 may establish, monitor, and/or terminate (e.g., tear down) sessions between endpoint devices 210.

Network 230 may include one or more wired and/or wireless networks. For example, network 230 may include a cellular network, a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
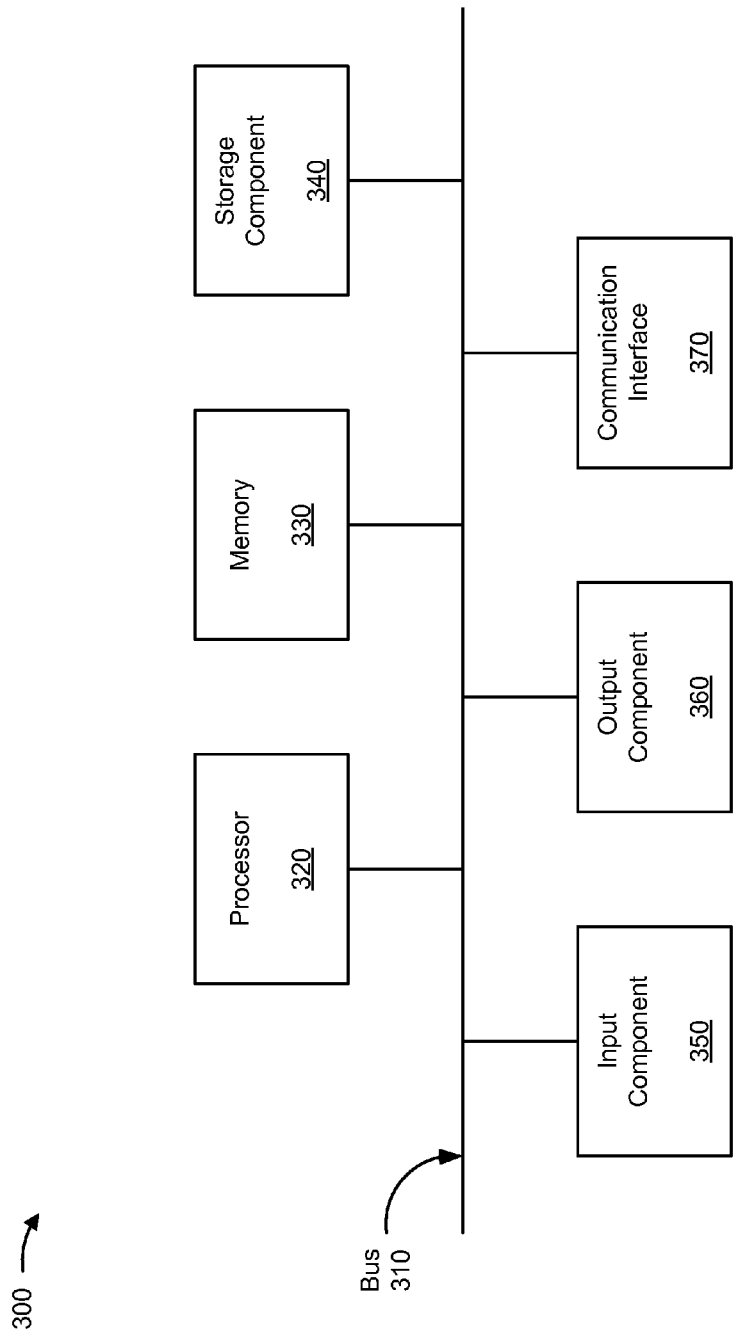
FIG. 3 is a diagram of example components of one or more devices of FIG. 2.

FIG. 3 is a diagram of example components of a device 300. Device 300 may correspond to endpoint device 210 and/or network device 220. In some implementations, endpoint device 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
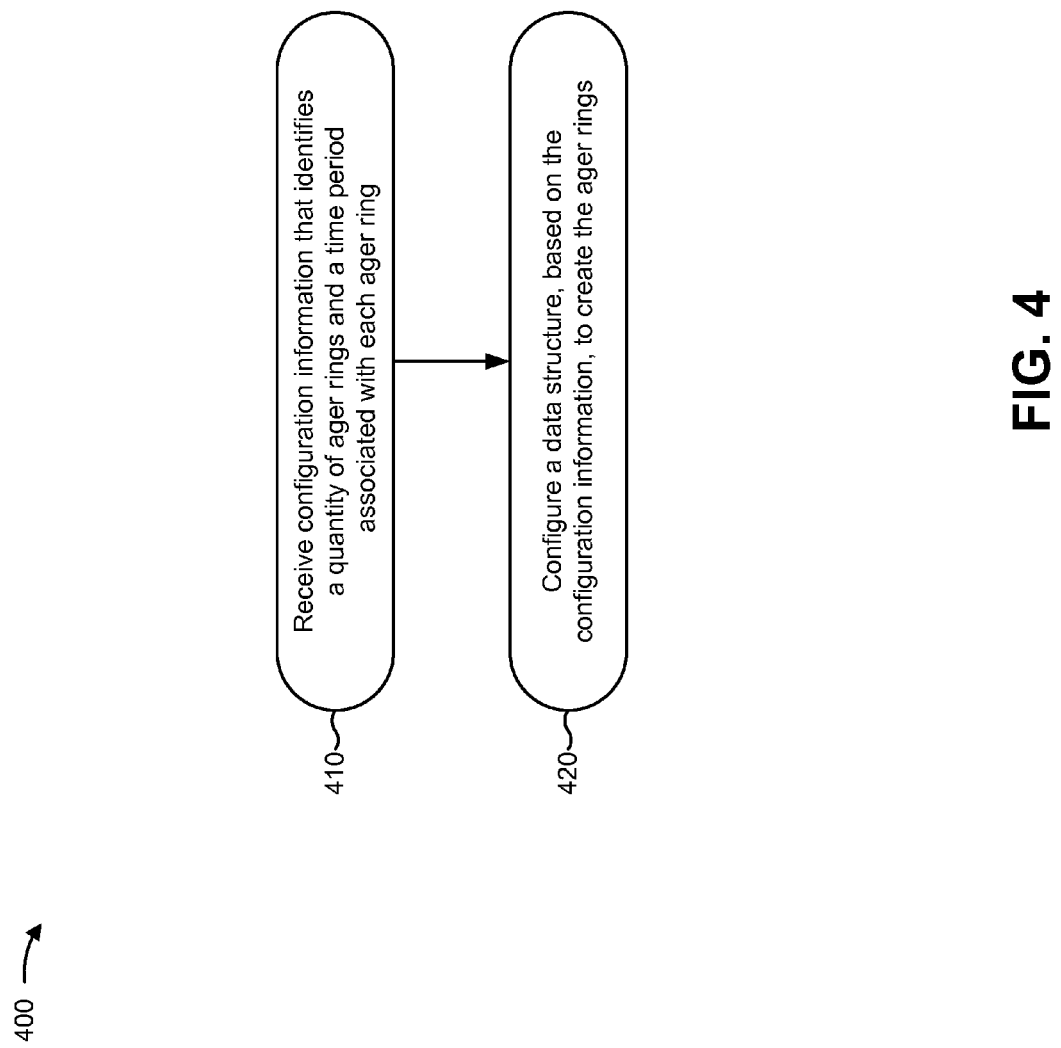
FIG. 4 is a flow chart of an example process for configuring multi-level ager rings.

FIG. 4 is a flow chart of an example process 400 for configuring multi-level ager rings. In some implementations, one or more process blocks of FIG. 4 may be performed by network device 220. In some implementations, one or more process blocks of FIG. 4 may be performed by another device or a group of devices separate from or including network device 220, such as endpoint device 210.

As shown in FIG. 4, process 400 may include receiving configuration information that identifies a quantity of ager rings and a time period associated with each ager ring (block 410). For example, network device 220 may receive configuration information for configuring multiple ager rings. Network device 220 may receive the configuration information based on user input and/or based on input received from another device (e.g., an input device that provides a console for accessing and/or configuring network device 220).

The configuration information may identify configuration parameters for an ager ring to be created, configured, and/or stored by network device 220. An ager ring may refer to a ring-based aging mechanism used by network device 220 to manage session expiration. The ager ring may use pointers (e.g., a session pointer, an aging pointer, etc.) to manage session expiration, as described in more detail elsewhere herein. An ager ring may include a particular quantity of time buckets, with each time bucket representing a particular amount of time. When the particular amount of time passes, network device 220 may move a pointer from a first time bucket to a second time bucket. The ager ring may also be associated with a total time period, which may represent a total amount of time required to move through every time bucket in the ager ring. For example, an ager ring that includes ten time buckets of one second each may be associated with a total time period of ten seconds.

A time period associated with a bucket (e.g., an amount of time represented by a single bucket) may be referred to as a bucket time period, and a time period associated with an ager ring (e.g., a total amount of time require to traverse the entire ager ring) may be referred to as a ring time period. The configuration information may specify a bucket time period for an ager ring, a quantity of time buckets to be included in the ager ring, a ring time period for the ager ring (e.g., the quantity of time buckets times the bucket time period), etc.

The configuration information may identify a quantity of ager rings to be created, configured, and/or stored by network device 220. For example, network device 220 may create, configure, and/or store multiple ager rings, which may be used separately or together to measure session life cycles for sessions with different life cycle lengths. When network device 220 uses multiple ager rings, the configuration information may include configuration information for each ager ring (e.g., a bucket time period for each ager ring, a quantity of time buckets for each ager ring, a ring time period for each ager ring, etc.). In some implementations, the bucket time period may be different for each ager ring and/or the ring time period may be different for each ager ring. In some implementations, the quantity of time buckets may be the same or different for different ager rings.

In some implementations, network device 220 may configure multiple ager rings such that a ring time period of a first ager ring (e.g., a lower-level ager ring) is equal to a bucket time period for a second ager ring (e.g., a higher-level ager ring). In this way, when network device 220 completes one traversal of the first ager ring (using a pointer), network device 220 may move a pointer associated with the second ager ring from a first time bucket to a second time bucket. Thus, network device 220 may use multiple ager rings in connection with one another to measure the passage of time for session management. Multiple ager rings are sometimes referred to herein as multi-level ager rings.

While some implementations are described herein as using two ager rings (e.g., a first-level (lower-level) ager ring and a second-level (higher-level) ager ring), network device 220 may configure and use a different quantity of ager rings, in some implementations. For example, network device 220 may configure a first-level ager ring and a second-level ager ring such that a ring time period of the first-level ager ring is equal to a bucket time period of the second-level ager ring, and may configure a third-level ager ring such that a ring time period of the second-level ager ring is equal to a bucket time period of the third-level ager ring. Network device 220 may configure another quantity of ager rings in this manner, where a ring time period of a lower-level ager ring is equal to a bucket time period of a higher-level ager ring.

As further shown in FIG. 4, process 400 may include configuring a data structure, based on the configuration information, to create the ager rings (block 420). For example, network device 220 may use the configuration information to create multiple ager rings based on the configuration parameters identified in the configuration information. An ager ring is an example of one type of data structure that network device 220 may create to monitor session expiration. In some implementations, network device 220 may create a different type of data structure to monitor session expiration, such as a tree, a linked list, a table, or the like.

When creating the ager rings, network device 220 may allocate a particular amount of memory for storing the ager rings and/or for storing information used in connection with the ager rings to monitor session expiration (e.g., for storing pointers, values, indicators, or other information described herein). The amount of memory allocated by network device 220 may be based on a size of the ager rings (e.g., a quantity of time buckets included in an ager ring, a ring time period associated with an ager ring, a bucket time period associated with an ager ring, etc.). By using different-sized ager rings, network device 220 may conserve memory by primarily using smaller-sized ager rings for sessions with shorter life cycles (e.g., 30 minutes), and only using larger-sized ager rings for sessions with longer life cycles.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
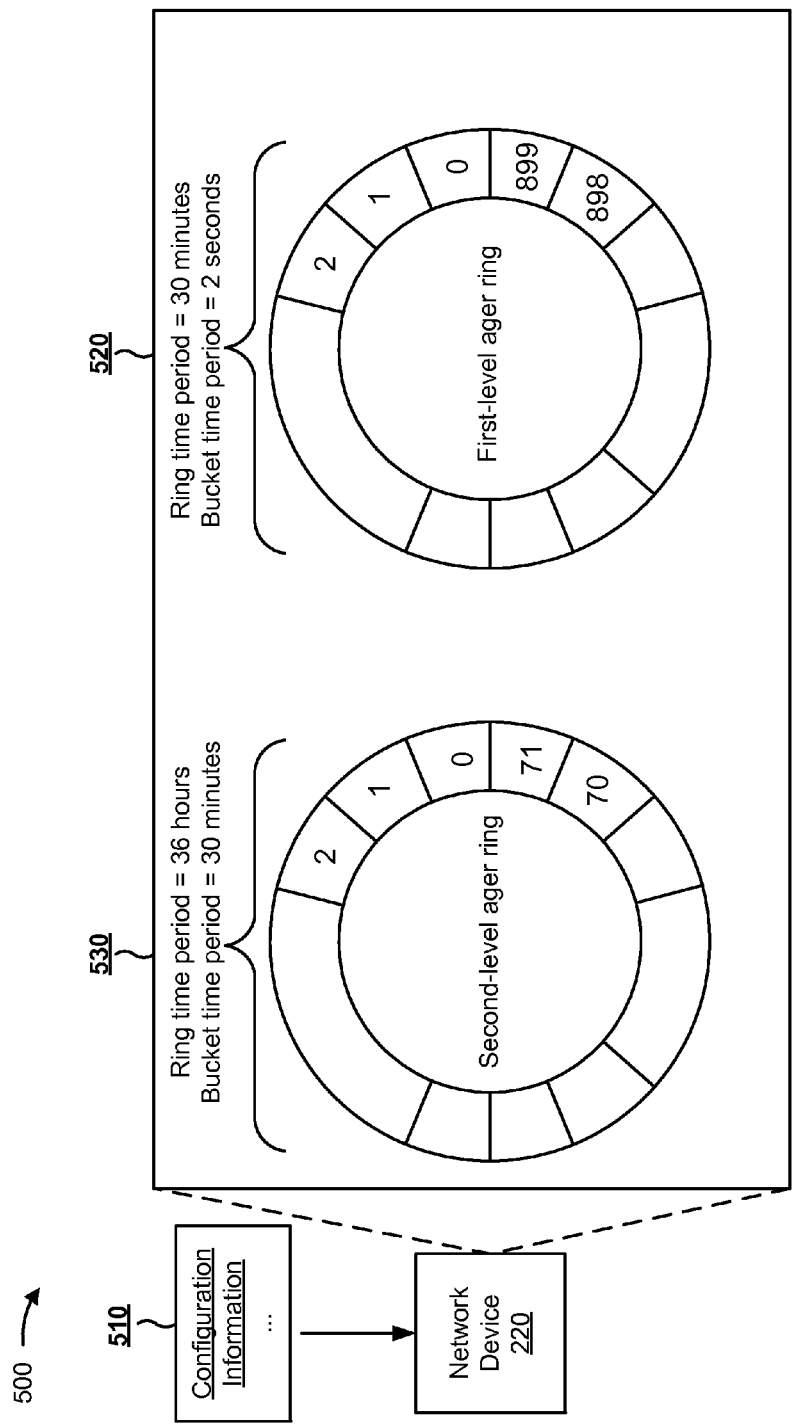
FIG. 5 is a diagram of an example implementation relating to the example process shown in FIG. 4.

FIG. 5 is a diagram of an example implementation 500 relating to example process 400 shown in FIG. 4. FIG. 5 shows an example of configuring multi-level ager rings.

As shown in FIG. 5, and by reference number 510, assume that network device 220 receives configuration information for configuring multi-level ager rings. Assume that the configuration information instructs network device 220 to create two ager rings, with a 2 second bucket time period and a 30 minute ring time period for the lower-level (e.g., first-level) ager ring, and a 30 minute bucket time period and a 36 hour ring time period for the higher-level (e.g., second-level) ager ring.

As shown by reference number 520, assume that network device 220 creates the first-level ager ring with 900 time buckets each having a 2 second bucket time period, for a total first-level ring time period of 1800 seconds, or 30 minutes. As shown by reference number 530, assume that network device 220 creates the second-level ager ring with 72 time buckets each having a 30 minute bucket time period, for a total second-level ring time period of 2160 minutes, or 36 hours. Further, assume that network device 220 checks the ring time period of the first-level ager ring (e.g., 30 minutes) and the bucket time period of the second-level ager ring (e.g., 30 minutes) to ensure that the two time periods are equal. In this way, network device 220 may ensure a proper configuration for the multiple ager rings to be used to monitor session expiration, as described in more detail elsewhere herein.

As indicated above, FIG. 5 is provided merely as an example. Other examples are possible and may differ from what was described with regard to FIG. 5.

Figure 6:
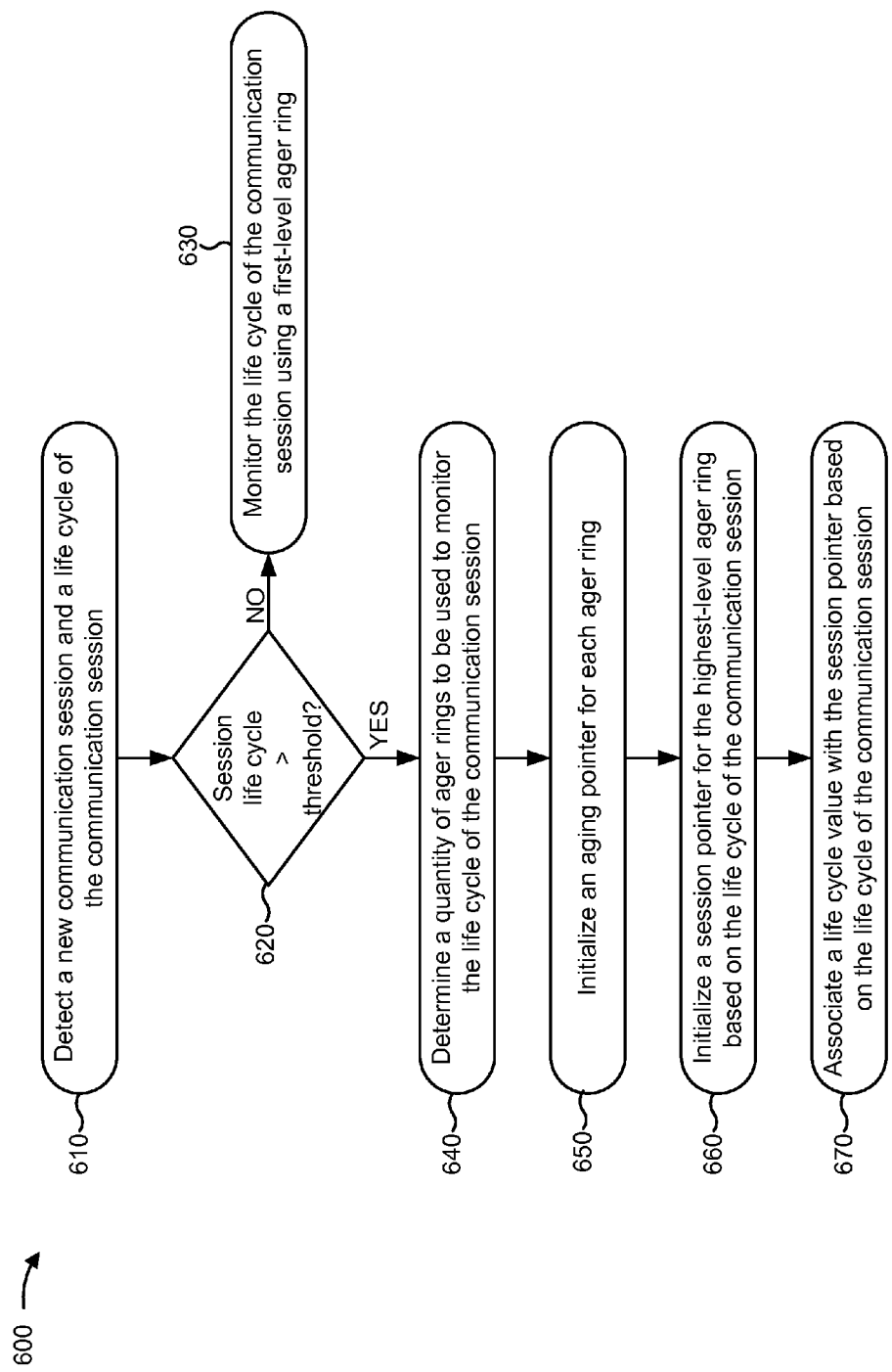
FIG. 6 is a flow chart of an example process for associating a communication session with a multi-level ager ring.

FIG. 6 is a flow chart of an example process 600 for associating a communication session with a multi-level ager ring. In some implementations, one or more process blocks of FIG. 6 may be performed by network device 220. In some implementations, one or more process blocks of FIG. 6 may be performed by another device or a group of devices separate from or including network device 220, such as endpoint device 210.

As shown in FIG. 6, process 600 may include detecting a new communication session and a life cycle of the communication session (block 610). For example, network device 220 may detect a new communication session (e.g., sometimes referred to herein as a "session"). A session may refer to a particular transportation connection between two endpoint devices 210, and may be identified based on one or more identifiers included in a packet (e.g., a source network address, a destination network address, a source port identifier, a destination port identifier, a protocol, etc.). In some implementations, network device 220 may assist in establishing a communication session. Additionally, or alternatively, network device 220 may read packet information, included in a packet, to identify a session associated with the packet. Network device 220 may determine whether the session is a new session or an existing session (e.g., by searching a data structure to determine whether a matching session identifier is stored).

Network device 220 may determine a life cycle of the session. A life cycle of a session (e.g., a session life cycle) may refer to a time period after which the session is to be terminated (e.g., if there is no additional session activity). For example, the session life cycle may represent a timeout period, an expiration period, etc., for the session. In some implementations, network device 220 may determine the session life cycle based on a protocol associated with the session (e.g., a transport control protocol (TCP), a uniform datagram protocol (UDP), etc.). Additionally, or alternatively, network device 220 may determine the session life cycle based on a life cycle identifier included in the packet and/or associated with a session identifier.

As further shown in FIG. 6, process 600 may include determining whether the session life cycle satisfies a threshold (block 620). For example, network device 220 may determine whether the session life cycle satisfies a threshold associated with a lower-level ager ring. The threshold may represent a ring time period associated with the lower-level ager ring, in some implementations. As an example, network device 220 may determine whether the session life cycle is greater than the ring time period.

As further shown in FIG. 6, if the session life cycle does not satisfy the threshold (block 620—NO), then process 600 may include monitoring the life cycle of the communication session using a first-level ager ring (block 630). For example, if network device 220 determines that the session life cycle is less than or equal to the first-level ring time period, then network device 220 may monitor the life cycle of the session using the first-level ager ring (e.g., may not use multiple ager rings to monitor the life cycle). As an example, if a first-level ager ring has a 30 minute ring time period, and the session life cycle is 30 minutes or less, then network device 220 may monitor the entire life cycle of the session using the first-level ager ring.

As further shown in FIG. 6, if the session life cycle satisfies the threshold (block 620—YES), then process 600 may include determining a quantity of ager rings to be used to monitor the life cycle of the communication session (block 640). For example, if network device 220 determines that the session life cycle is greater than the first-level ring time period, then network device 220 may monitor the life cycle of the session using multiple ager rings. As an example, if a first-level ager ring has a 30 minute ring time period, and the session life cycle is greater than 30 minutes, then network device 220 may use multiple ager rings to monitor the life cycle of the session.

Network device 220 may use multiple thresholds, corresponding to multiple ager rings, to determine the quantity of ager rings to be used to monitor the session life cycle. In some implementations, network device 220 may successively compare the session life cycle to ring time periods associated with successively higher-level ager rings. For example, assume that a first-level ager ring has a 30 minute ring time period, a second-level ager ring has a 6 hour ring time period, and a third-level ager ring has a 10 day time period. In this case, network device 220 may use all three ager rings to monitor sessions with a life cycle greater than 6 hours, may use the first two ager rings to monitor sessions with a life cycle greater than 30 minutes but less than or equal to 6 hours, and may use only the first-level ager ring to monitor sessions with a life cycle of 30 minutes or less.

As further shown in FIG. 6, process 600 may include initializing an aging pointer for each ager ring (block 650). For example, network device 220 may initialize an aging pointer for each ager ring. An aging point may refer to an indicator that measures the passage of time (e.g., using an ager ring). Network device 220 may initialize an aging pointer by setting an aging pointer position to indicate that the aging pointer is pointing to an initial time bucket (e.g., time bucket zero) on an ager ring. Then, when an amount of time equal to a bucket time period has elapsed, network device 220 may update the aging pointer by setting the aging pointer position to indicate that the aging pointer is pointing to a next time bucket (e.g., time bucket one), indicating that the bucket time period has elapsed. Network device 220 may continue to update the aging pointer (e.g., the aging point position) in this manner to measure an amount of time that has elapsed since the aging pointer was initialized. In some implementations, network device 220 may initialize a different aging pointer for each ager ring created by network device 220 to monitor the session life cycle.

As further shown in FIG. 6, process 600 may include initializing a session pointer for the highest-level ager ring based on the life cycle of the communication session (block 660). For example, network device 220 may initialize a session pointer for the highest-level ager ring. A session pointer may refer to an indicator positioned to trigger session expiration. For example, when the aging pointer points to the same time bucket as the session pointer, network device 220 may terminate the session (or may determine to update a position of the session pointer, as described in more detail elsewhere herein). Network device 220 may initialize the session pointer by setting a session pointer position to a time bucket indicative of a life cycle of the session.

For example, assume that a session has a ten second life cycle, and each time bucket represents one second. In this case, network device 220 may initialize an aging pointer to point to the first time bucket (e.g., time bucket zero), and may initialize the session pointer to point to the tenth time bucket (e.g., time bucket nine). Thus, when ten seconds pass, the aging pointer will point to the tenth time bucket (e.g., after traversing time buckets one through eight), and network device 220 may terminate the session because the aging point and the session pointer are pointing to the same time bucket.

In some implementations, network device 220 may initialize a session pointer for the highest-level ager ring, and may not initialize a session pointer for any of the lower-level ager rings. For example, assume that a first-level ager ring has a ring time period of 30 minutes, a second-level ager ring has a ring time period of 4 hours, and a session life cycle is 60 minutes. In this case, the first-level ager ring is not large enough to measure the 60 minute life cycle. Thus, network device 220 may initialize the session pointer for the second-level ager ring. For example, network device 220 may position the session pointer to point to the third time bucket of the second-level ager ring, because the aging pointer will point to the third time bucket after 60 minutes (e.g., the aging pointer will be initialized to the first time bucket, will move to the second time bucket after 30 minutes elapse, and will move to the third time bucket after an additional 30 minutes elapse).

As further shown in FIG. 6, process 600 may include associating a life cycle value with the session pointer based on the life cycle of the communication session (block 670). For example, network device 220 may associate a life cycle value with the session pointer. The life cycle value may indicate a life cycle of the session. For example, when the life cycle session is 3 hours, the life cycle value may indicate that the life cycle session is 3 hours (e.g., 180 minutes, 10,800 seconds, etc.). In some implementations, network device 220 may determine the life cycle value based on the session life cycle and a lower-level bucket time period. For example, if a lower-level bucket time period is equal to 2 seconds, and the life cycle session is 45 minutes, then network device 220 may set the life cycle value to 1,350, indicating that 1,350 bucket time periods must elapse before session expiration (e.g., 45 minutes×60 seconds per minute=2700 seconds, and 2700 seconds/2 seconds per bucket time period=1,350 bucket time periods).

Network device 220 may use the life cycle value to determine session expiration in the case where the session life cycle does not equal a ring time period or an integer multiple of a ring time period. For example, assume that a first-level ager ring has a ring time period of 30 minutes, a second-level ager ring has a ring time period of 4 hours, and a session life cycle is 45 minutes. In this case, network device 220 may initialize the session pointer to point to the second time bucket of the second-level ager ring. After 30 minutes elapse, network device 220 may update the aging pointer for the second-level ager ring to point to the second time bucket. However, the session has not yet expired because 15 minutes remain. In this case, network device 220 may use the stored life cycle value to determine a remaining life cycle and/or to update the session pointer, as described in more detail elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
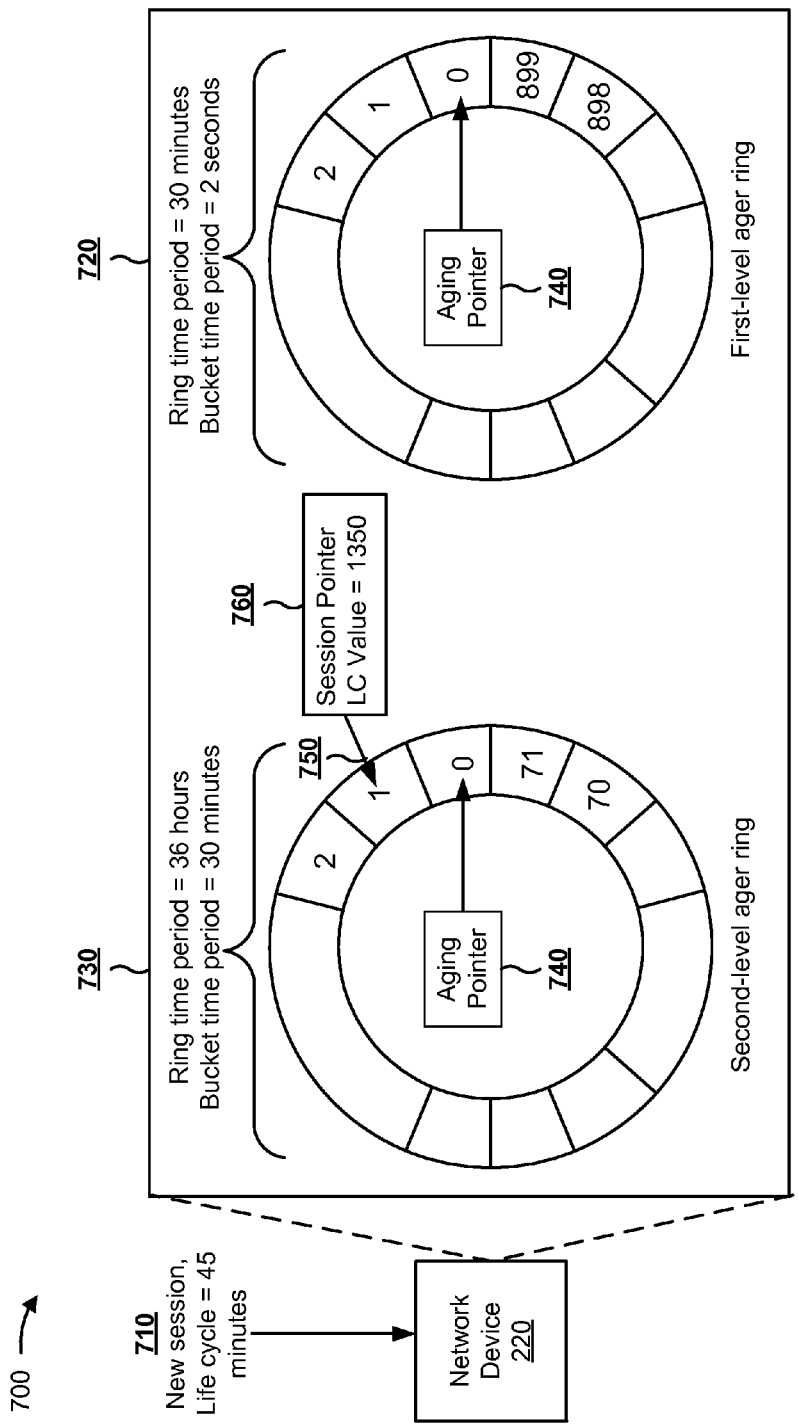
FIG. 7 is a diagram of an example implementation relating to the example process shown in FIG. 6.

FIG. 7 is a diagram of an example implementation 700 relating to example process 600 shown in FIG. 6. FIG. 7 shows an example of associating a communication session with a multi-level ager ring. For the purpose of FIG. 7, assume that the operations described herein in connection with FIG. 5 have been performed.

As shown in FIG. 7, and by reference number 710, assume that network device 220 detects a new session, and determines that the life cycle of the session is 45 minutes. Further, assume that network device 220 determines that the session life cycle of 45 minutes is greater than the ring time period of 30 minutes associated with a first-level ager ring, shown by reference number 720, and is less than the ring time period of 36 hours associated with a second-level ager ring, shown by reference number 730. Thus, assume that network device 220 determines that two ager rings are to be used to monitor the session (e.g., the two ager rings shown).

As shown by reference number 740, assume that network device 220 initializes a first aging pointer for a first time bucket (e.g., time bucket zero) of the first-level ager ring, and initializes a second aging pointer for a first time bucket (e.g., time bucket zero) of the second-level ager ring. As shown by reference number 750, assume that network device 220 initializes a session pointer for a second time bucket (e.g., time bucket one) of the second-level ager ring. Assume that network device 220 determines the time bucket on which to position the session pointer by performing integer division using the session life cycle (45 minutes) and the first-level ring time period (30 minutes) (e.g., 45 minutes/30 minutes=1.5, which is equal to 1 using integer division (e.g., without the remainder)).

As shown by reference number 760, assume that network device 220 determines a life cycle value to be associated with the session pointer. Assume that network device 220 determines the life cycle value based on the session life cycle (45 minutes) and the first-level bucket time period (2 seconds). For example, assume that network device 220 converts the session life cycle of 45 minutes to 2700 seconds, and divides 2700 seconds by the first-level bucket time period of 2 seconds to calculate a value of 1,350 for the life cycle value. This life cycle value indicates the quantity of bucket time periods (1,350) that must elapse before the session expires. Assume that network device 220 stores the life cycle value (e.g., in association with the session pointer). In this way, network device 220 may initialize multiple ager rings to monitor a new session.

As indicated above, FIG. 7 is provided merely as an example. Other examples are possible and may differ from what was described with regard to FIG. 7.

Figure 8:
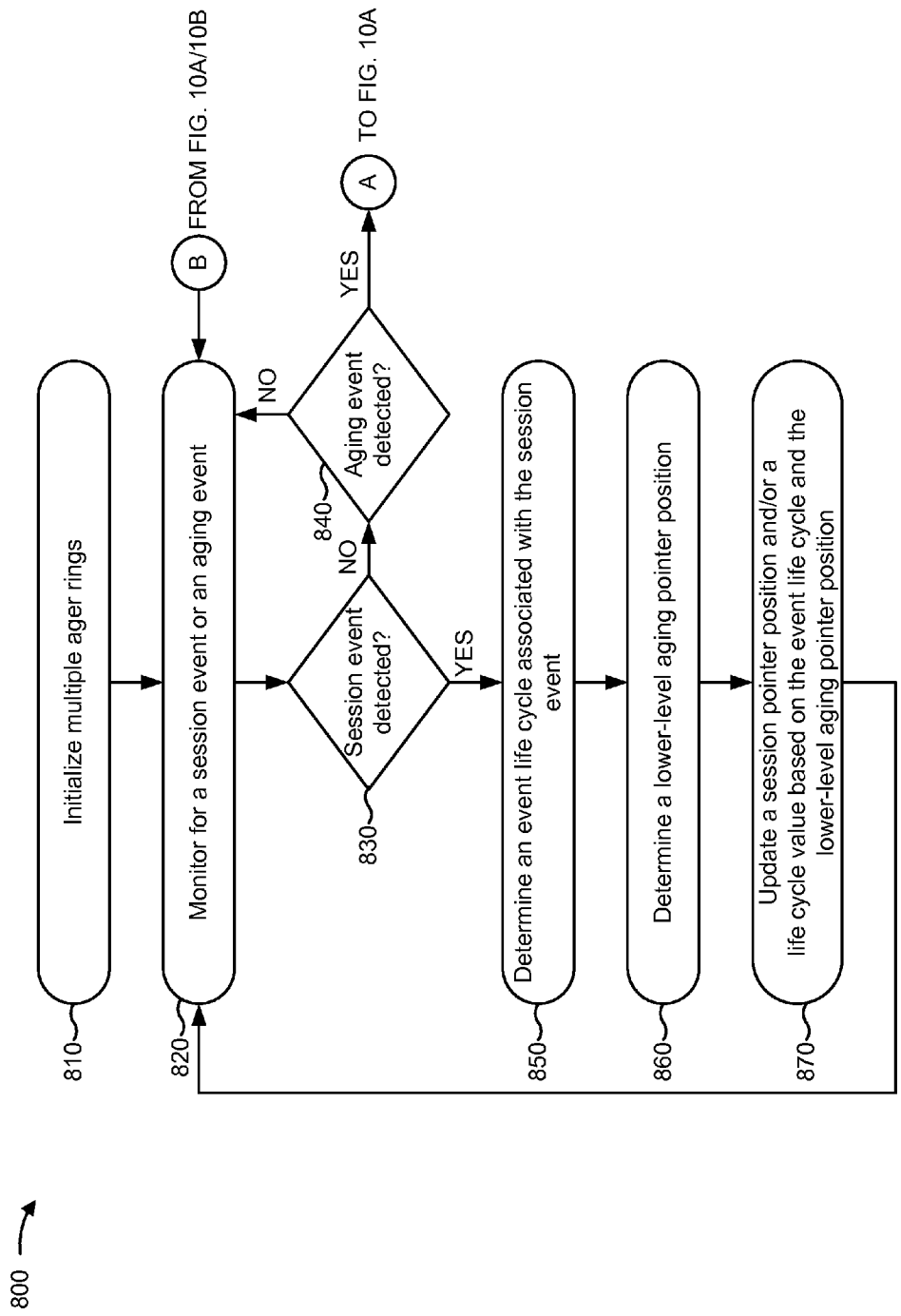
FIG. 8 is a flow chart of an example process for updating an ager ring when a session event is detected.

FIG. 8 is a flow chart of an example process 800 for updating an ager ring when a session event is detected. In some implementations, one or more process blocks of FIG. 8 may be performed by network device 220. In some implementations, one or more process blocks of FIG. 8 may be performed by another device or a group of devices separate from or including network device 220, such as endpoint device 210.

As shown in FIG. 8, process 800 may include initializing multiple ager rings (block 810). For example, network device 220 may initialize multiple ager rings, as described above.

As further shown in FIG. 8, process 800 may include monitoring for a session event or an aging event (block 820). For example, network device 220 may monitor for a session event. A session event may include, for example, receiving a packet associated with the session (e.g., a packet that includes a session identifier; a packet that includes a particular parameter or combination of parameters, such as a source network address, a destination network address, a source port identifier, a destination port identifier, a protocol, or the like; etc.), receiving an indication to extend or shorten the session (e.g., based on user input and/or input received from another device), receiving an indication to change a length of the session life cycle, etc.

A session life cycle may indicate an amount of time after which a session is to be terminated if no session events occur during the life cycle. Thus, when a session event occurs, network device 220 may update a session pointer to reflect a change in the amount of time until the session is to be terminated. A session event may refer to an event that causes network device 220 to update a session pointer (e.g., to move the session pointer to a different position).

Additionally, or alternatively, network device 220 may monitor for an aging event. An aging event may refer to an event that causes network device 220 to update an aging pointer (e.g., to move the aging pointer to a different position). For example, an aging event may include the passage of a bucket time period and/or a ring time period. When an amount of time associated with a bucket time period elapses, network device 220 may update the position of an aging pointer.

As further shown in FIG. 8, process 800 may include determining whether a session event has been detected (block 830). For example, network device 220 may monitor packet activity to determine whether a session event has occurred. Network device 220 may monitor an environment of network device 220 continuously, periodically based on a clock cycle, periodically at a particular time interval, such as a time interval equal to a bucket time period, or the like. For example, network device 220 may read packet information from incoming packets, and may determine whether the packet is associated with an existing session. If a packet is associated with an existing session, then network device 220 may determine that a session event has been detected.

As further shown in FIG. 8, if a session event has not been detected (block 830—NO), then process 800 may include determining whether an aging event has been detected (block 840). For example, network device 220 may monitor the passage of time to determine whether an aging event has occurred (e.g., whether an amount of time equal to a bucket time period has elapsed). While FIG. 8 shows network device 220 checking for session events before checking for aging events, network device 220 may perform these processes serially in any order, or may perform these processes in parallel.

Figure 10B:
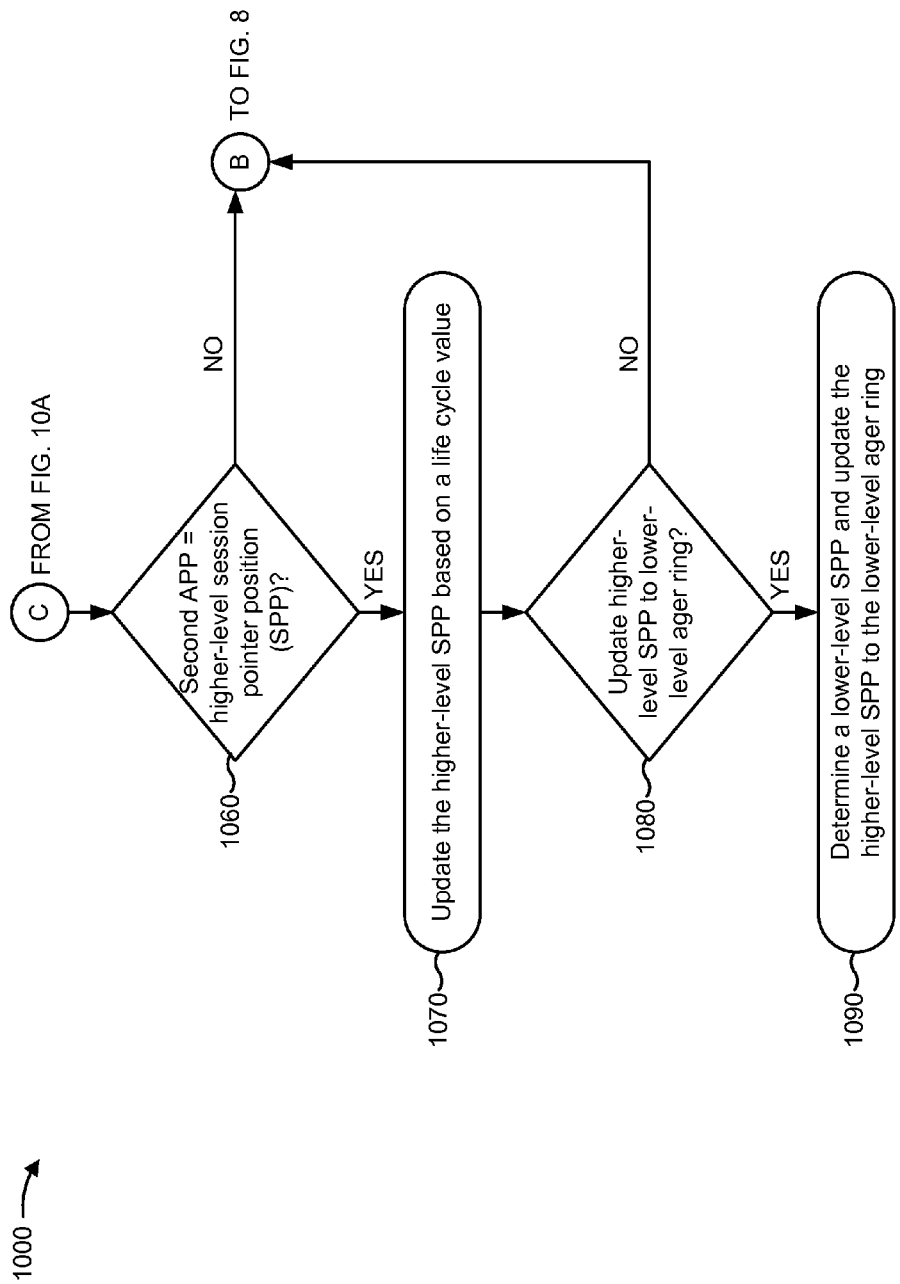

As further shown in FIG. 8, if an aging event has been detected (block 840—YES), then network device 220 may perform one or more blocks of process 1000, shown in FIGS. 10A and 10B, and described in more detail elsewhere herein.

As further shown in FIG. 8, if an aging event has not been detected (block 840—NO), then process 800 may return to block 820, and network device 220 may continue to monitor for session events and/or aging events.

As further shown in FIG. 8, if a session event has been detected (block 830—YES), then process 800 may include determining an event life cycle associated with the session event (block 850). For example, if network device 220 detects a session event, then network device 20 may determine an event life cycle associated with the session event. An event life cycle may refer to a time period, measured from the occurrence of the session event, after which the session is to be terminated if no additional session events occur during the time period.

The event life cycle may be a same time period as the session life cycle determined when the session was initially detected, in some implementations. For example, assume that a TCP session has a life cycle of 30 minutes, and that during the life cycle, network device 220 receives a packet associated with the TCP session. In this case, network device 220 may determine that the event life cycle is another 30 minutes, and may update a session pointer to a time bucket indicative of a point in time 30 minutes from when the packet was received.

The event life cycle may be a different time period than the session life cycle determined when the session was initially detected, in some implementations. For example, assume that network device 220 receives a packet associated with a TCP handshake operation for establishing a TCP session. Further, assume that session life cycle associated with this packet is 6 seconds. Within this 6 second session life cycle, assume that network device 220 detects a session event indicating that the TCP handshake operation has been successfully completed, and that a TCP session, with a life cycle of 30 minutes, has been established. In this case, network device 220 may determine that the event life cycle is 30 minutes, and may update a session pointer to a time bucket indicative of a point in time 30 minutes from when the packet was received. In other words, the event life cycle may be a session life cycle with a same time period or a different time period than another session life cycle (e.g., determined when the session detected, determined when a different session event is detected, etc.).

As further shown in FIG. 8, process 800 may include determining a lower-level aging pointer position (block 860), and updating a session pointer position and/or a life cycle value based on the event life cycle and the lower-level aging pointer position (block 870). For example, network device 220 may determine a lower-level aging pointer position based on detecting a session event. A lower-level aging pointer position may refer to a position of an aging pointer at a particular time bucket of a lower-level ager ring (e.g., a first-level ager ring).

Network device 220 may use the lower-level aging pointer position and the event life cycle to update a session pointer position, in some implementations. In some implementations, the session pointer may be positioned on a time bucket of a higher-level ager ring. As an example, network device 220 may move the session pointer to a position that represents a point in time that is a particular time period from the current time represented by the aging pointer, where the particular time period is equal to the time period represented by the event life cycle. In other words, network device 220 may move the session pointer to a session pointer position such that when the event life cycle elapses, the aging pointer position will be the same as the session pointer position (e.g., the aging pointer and the session pointer will be pointing to a same time bucket, indicating that the session is to be terminated). In some implementations, network device 220 may re-initialize the aging pointer (e.g., to time bucket zero, as described elsewhere herein), and may initialize the session pointer based on the aging pointer position and the event life cycle, as described herein in connection with FIG. 6.

Additionally, or alternatively, network device 220 may use the lower-level aging pointer position and the event life cycle to update a life cycle value associated with the session. Network device 220 may update the life cycle value to a value that indicates a point in time that is a particular time period from the current time represented by the aging pointer, where the particular time period is equal to the time period represented by the event life cycle. For example, network device 220 may update the life cycle value by adding an aging pointer value indicative of an amount of time that has elapsed since the aging pointer was initialized. In this way, network device 220 may update a session pointer when a session event occurs, so that network device 220 may properly monitor for session expiration.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
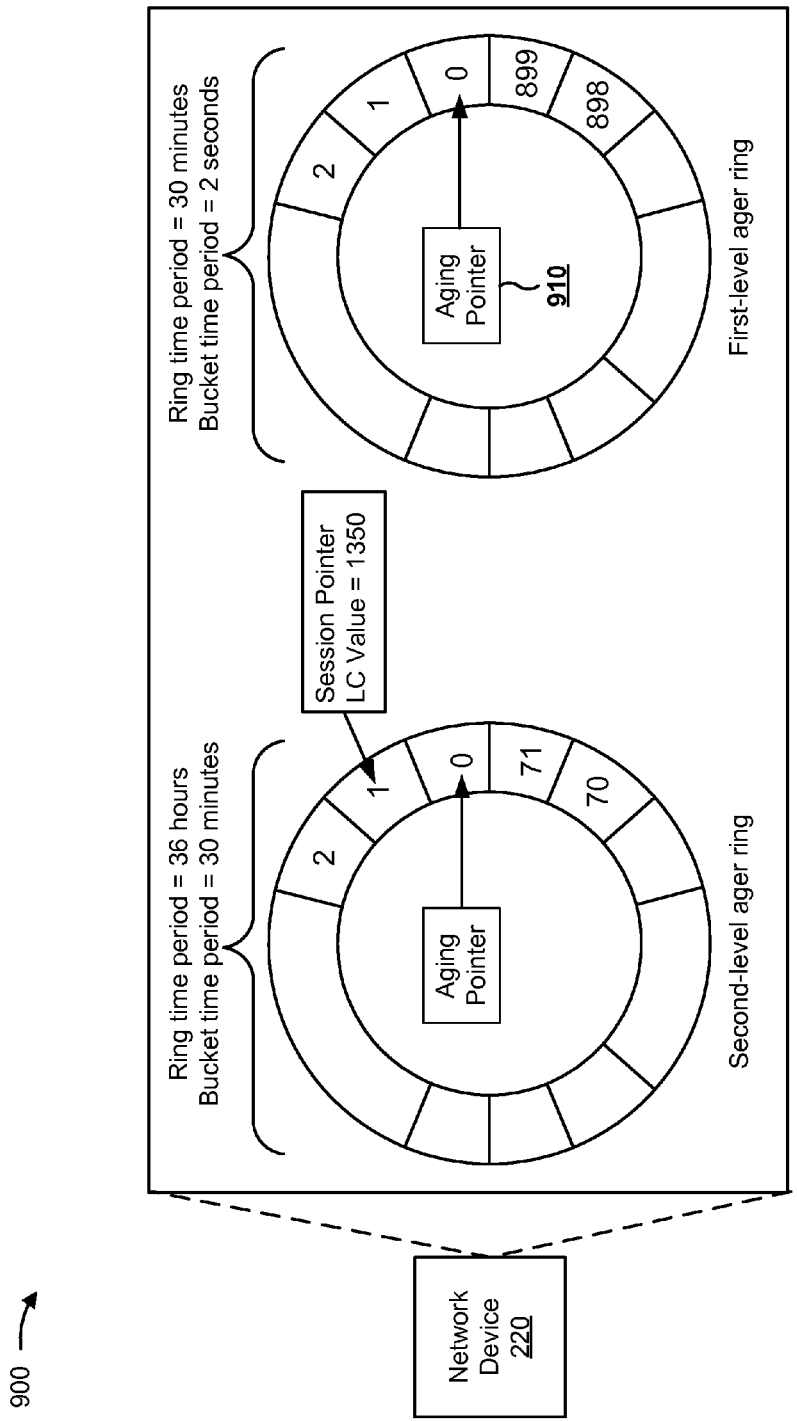
FIGS. 9A-9C are diagrams of an example implementation relating to the example process shown in FIG. 8.
Figure 9B:
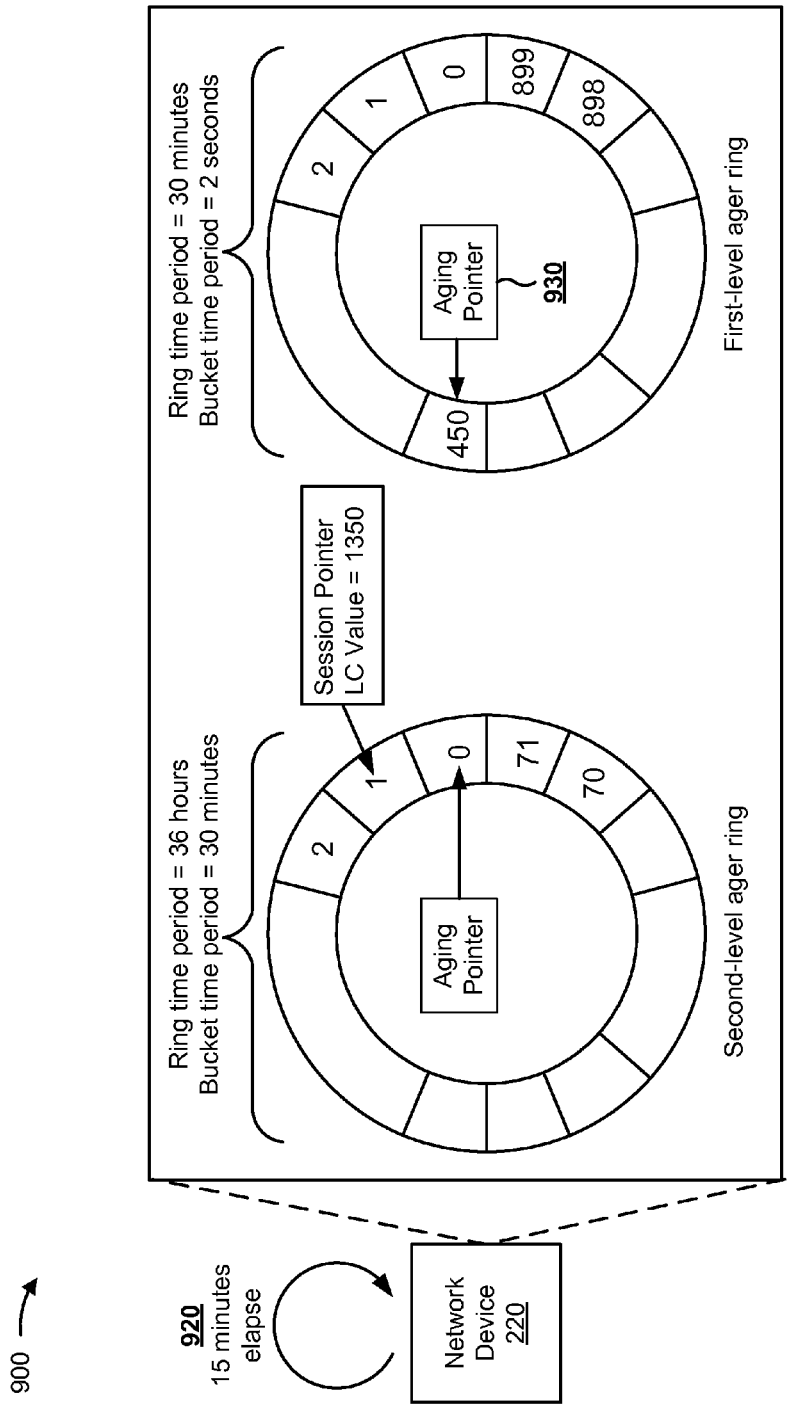
Figure 9C:
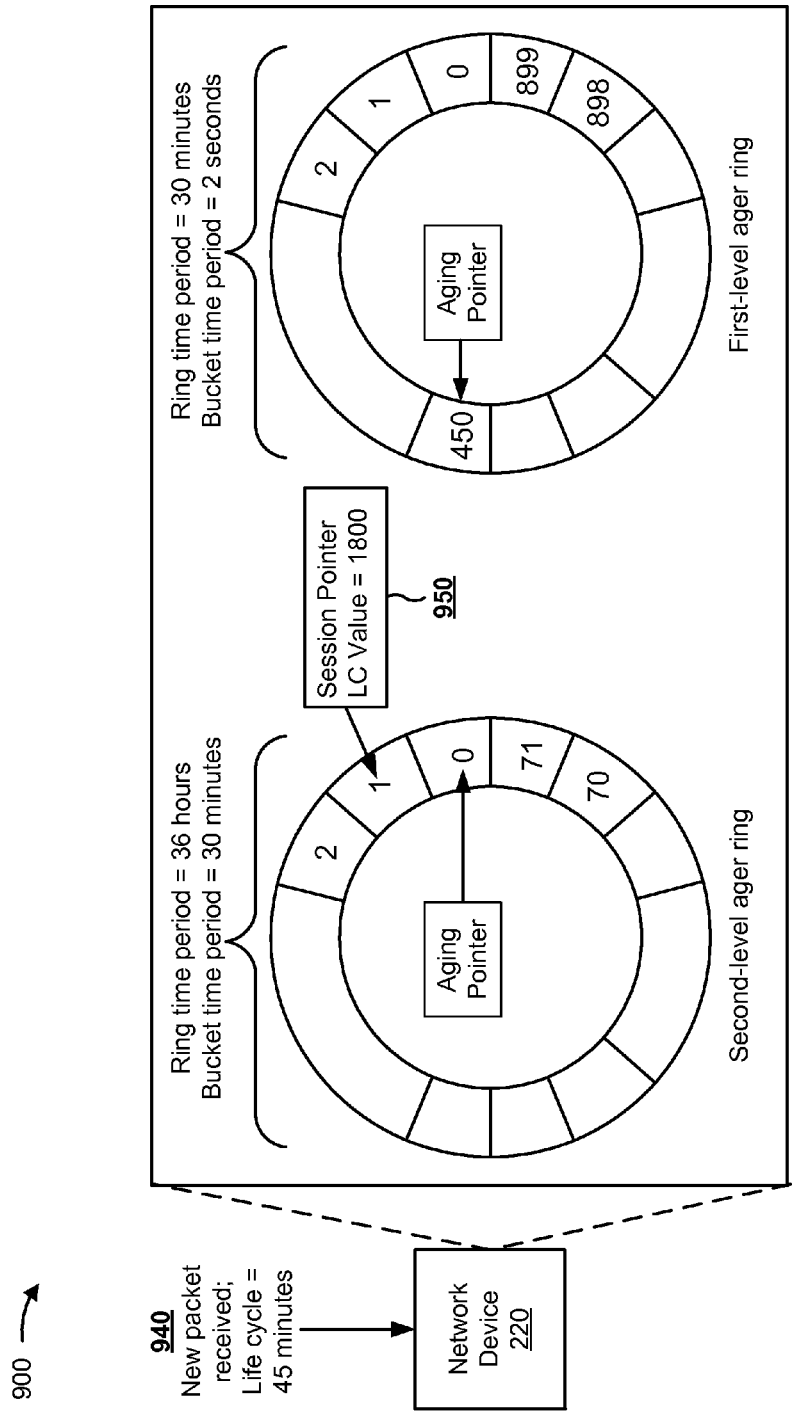

FIGS. 9A-9C are diagrams of an example implementation 900 relating to example process 800 shown in FIG. 8. FIGS. 9A-9C show an example of updating an ager ring when a session event is detected. For the purpose of FIGS. 9A-9C, assume that the operations described herein in connection with FIG. 5 and FIG. 7 have been performed.

As shown in FIG. 9A, assume that network device 220 has initialized two ager rings, shown as a first-level ager ring and a second-level ager ring, as described herein in connection with FIG. 7. As shown, assume that the first-level ager ring has a ring time period of 30 minutes and a bucket time period of 2 seconds. As further shown, assume that the second-level ager ring has a ring time period of 36 hours and a bucket time period of 30 minutes. Further, assume that network device 220 has initialized the second-level ager ring with an aging pointer for the first time bucket (time bucket zero), and a session pointer for the second time bucket (time bucket one), and has associated a life cycle value of 1350 with the session pointer. As shown by reference number 910, assume that network device 220 has initialized the first-level ager ring with an aging pointer on the first time bucket (time bucket zero).

As shown in FIG. 9B, and by reference number 920, assume that 15 minutes elapse. Based on the 15 minutes elapsing, network device 220 has updated the aging pointer for the first-level ager ring to point to time bucket 450, as shown by reference number 930. Because each time bucket represents 2 seconds, and network device 220 has traversed 450 time buckets, this indicates that 900 seconds have elapsed (e.g., 2 seconds per time bucket×450 time buckets=900 seconds), which is equal to 15 minutes (e.g., 900 seconds/60 seconds per minute=15 minutes).

As shown in FIG. 9C, and by reference number 940, assume that network device 220 receives a new packet associated with the session (e.g., after the 15 minutes, shown in FIG. 9B, elapse). As further shown, assume that the new packet is associated with a 45 minute event life cycle. Based on receiving the new packet, assume that network device 220 updates the life cycle value from 1350 to 1800, as shown by reference number 950. For example, assume that network device 220 adds the current time bucket of the aging pointer for the lower-level ager ring (e.g., 450) to the life cycle value of 1350 to calculate a new life cycle value of 1800 (e.g., since the event life cycle is the same as the initial session life cycle). In other words, assume that network device 220 determines a current time point of 900 seconds based on the aging pointer for the first-level ager ring (e.g., 450 time buckets×2 seconds per time bucket=900 seconds). Assume that network device 220 adds the event life cycle of 2700 seconds (e.g., 45 minutes) to the current time point of 900 seconds to calculate an updated life cycle value of 3600 seconds which is divided by 2 seconds per time bucket to generate a new life cycle value of 1800 time buckets.

As shown, assume that network device 220 associates the updated life cycle value of 1800 with the session pointer. In this way, network device 220 may update the ager rings when a session event is detected.

As indicated above, FIGS. 9A-9C are provided merely as an example. Other examples are possible and may differ from what was described with regard to FIGS. 9A-9C.

FIGS. 10A and 10B are flow charts of an example process 1000 for updating an ager ring when an aging event is detected. In some implementations, one or more process blocks of FIGS. 10A and 10B may be performed by network device 220. In some implementations, one or more process blocks of FIGS. 10A and 10B may be performed by another device or a group of devices separate from or including network device 220, such as endpoint device 210.

As shown in FIG. 10A, process 1000 may include updating a first aging pointer position (APP) on a lower-level ager ring (block 1010). For example, network device 220 may detect an aging event (e.g., as described herein in connection with FIG. 8), and may update a first aging pointer position of a first aging pointer positioned on a lower-level ager ring. An aging pointer position may refer to a position of an aging pointer at a particular time bucket. As an example, when a bucket time period elapses (e.g., a period of time equal to the bucket time period), network device 220 may move an aging pointer from a first position, on a first time bucket, to a second position on a second time bucket (e.g., the next time bucket).

As further shown in FIG. 10A, process 1000 may include determining whether the first aging pointer position indicates session expiration (block 1020). For example, network device 220 may determine whether the first (e.g., lower-level) aging pointer position indicates session expiration. In some implementations, network device 220 may compare the first aging pointer position to a session pointer position. If the first aging pointer and the session pointer are positioned at the same location (e.g., are pointing to a same time bucket), then network device 220 may determine that the first aging pointer position indicates session expiration. Otherwise, network device 220 may determine that the first aging pointer position does not indicate session expiration.

As further shown in FIG. 10A, if the first aging pointer position indicates session expiration (block 1020—YES), then process 1000 may include terminating the communication session (block 1030). For example, if network device 220 determines that the first aging pointer position indicates that the session has expired, then network device 220 may terminate the session (e.g., may tear down the session). Additionally, or alternatively, network device 220 may delete and/or reset (e.g., re-configure) one or more ager rings, aging pointers, session pointers, life cycle values, etc. associated with the session.

As further shown in FIG. 10A, if the first aging pointer position does not indicate session expiration (block 1020—NO), then process 1000 may include determining whether the first aging pointer position satisfies (e.g., is greater than or equal to) a lower-level threshold (block 1040). For example, if network device 220 determines that the aging pointer position does not indicate session expiration, then network device 220 may determine whether the first aging pointer position indicates that the lower-level ager ring has been completely traversed (e.g., whether a lower-level ring time period has elapsed).

As an example, network device 220 may determine whether the aging pointer has moved from a terminal time bucket and/or has moved to an initial time bucket (e.g., from a terminal time bucket). If the aging pointer has moved from a terminal time bucket and/or has moved to an initial time bucket, then network device 220 may determine that the first aging pointer position satisfies the lower-level threshold (e.g., has completely traversed the first ager ring). Otherwise, network device 220 may determine that the first aging pointer position does not satisfy the lower-level threshold.

As further shown in FIG. 10A, if the first aging pointer position does not satisfy (e.g., is less than) the lower-level threshold (block 1040—NO), then process 1000 may include returning to block 820 of FIG. 8 to monitor for a session event or an aging event. For example, if network device 220 determines that the first aging pointer position does not satisfy the lower-level threshold, then network device 220 may continue to monitor for a session event or an aging event. In this way, network device 220 may continue to update the ager ring(s) as session events or aging events occur (e.g., as time elapses).

As further shown in FIG. 10A, if the first aging pointer position satisfies (e.g., is greater than or equal to) the lower-level threshold (block 1040—YES), then process 1000 may include updating a second aging pointer position on a higher-level ager ring (block 1050). For example, if network device 220 determines that the first aging pointer position has completely traversed the lower-level ager ring, then network device 220 may update a second aging pointer position of a second aging pointer positioned on a higher-level ager ring. In some implementations, network device 220 may update the second aging pointer position so that the second aging pointer points to a next time bucket on the higher-level ager ring.

For example, when a lower-level aging pointer (e.g., a first aging pointer) completely traverses a lower-level ager ring, this indicates that a lower-level ring time period has elapsed. In some implementations, the lower-level ring time period may be equal to a higher-level (e.g., a next-higher-level) bucket time period. Thus, when the lower-level ring time period elapses (e.g., as indicated by the first aging pointer position satisfying the lower-level threshold), network device 220 may move the higher-level aging pointer (e.g., a second aging pointer) to a next time bucket. In this way, network device 220 may use the multiple ager rings to monitor the passage of time associated with session expiration.

As shown in FIG. 10B, process 1000 may include determining whether the second aging pointer position is the same as a higher-level session pointer position (SPP) (block 1060). For example, network device 220 may determine whether the second aging pointer position (e.g., a higher-level aging pointer position) is the same as a session pointer position of a session pointer for the higher-level ager ring (e.g., a higher-level session pointer position). In other words, network device 220 may determine whether the second aging pointer and the session pointer both point to the same time bucket (e.g., on the higher-level ager ring).

As further shown in FIG. 10B, if the second aging pointer position is not the same as the higher-level session pointer position (block 1060—NO), then process 1000 may include returning to block 820 of FIG. 8 to monitor for a session event or an aging event. For example, if network device 220 determines that the second aging pointer position is not the same as the higher-level session pointer position, then network device 220 may continue to monitor for a session event or an aging event. In this way, network device 220 may continue to update the ager ring(s) as session events or aging events occur (e.g., as time elapses).

As further shown in FIG. 10B, if the second aging pointer position is the same as the higher-level session pointer position (block 1060—YES), then process 1000 may include updating the higher-level session pointer position based on a life cycle value (block 1070). For example, if network device 220 determines that the second aging pointer position is the same as the higher-level session pointer position, then network device 220 may update the higher-level session pointer position.

In some implementations, network device 220 may update the higher-level session pointer position based on a life cycle value. For example, if network device 220 has increased the life cycle value since the session was established (e.g., and has not already updated the session pointer position based on the increase), then network device 220 may move the session pointer to a higher time bucket if the life cycle value indicates a remaining life cycle greater than a lower-level ring time period. Alternatively, network device 220 may move the session pointer to a lower-level ager ring if the life cycle value indicates a remaining life cycle less than a lower-level ring time period. Additionally, or alternatively, network device 220 may terminate the session if the life cycle value indicates no remaining life cycle.

As further shown in FIG. 10B, process 1000 may include determining whether to update a higher-level session pointer position to a lower-level ager ring (block 1080). For example, network device 220 may determine whether to move a session pointer, positioned on a higher-level ring, to a lower-level ring. In some implementations, network device 220 may make this determination based on a life cycle value. For example, if the life cycle value indicates a remaining life cycle greater than the lower-level ring time period, then network device 220 may not move the session pointer to a lower-level ring (e.g., and may move the session pointer to a higher time bucket on the higher-level ager ring, or may move the session pointer to a next-higher-level ager ring if the remaining life cycle is greater than the higher-level ring time period). In this case, network device 220 may not move the session pointer to a lower-level ager ring.

As another example, if the life cycle value indicates a remaining life cycle less than the lower-level ring time period, then network device 220 may move the session pointer to the lower-level ager ring.

As further shown in FIG. 10B, if the higher-level session pointer position is not to be updated to a lower-level ager ring (block 1080—NO), then process 1000 may include returning to block 820 of FIG. 8 to monitor for a session event or an aging event. For example, if network device 220 determines that the session pointer is not to be moved to a lower-level ager ring, then network device 220 may continue to monitor for a session event or an aging event. In this way, network device 220 may continue to update the ager ring(s) as session events or aging events occur (e.g., as time elapses).

As further shown in FIG. 10B, if the higher-level session pointer position is to be updated to a lower-level ager ring (block 1080—YES), then process 100 may include determining a lower-level session pointer position and updating the higher-level session pointer position to the lower-level ager ring (block 1090). For example, if network device 220 determines that the session pointer is to be moved to a lower-level ager ring, then network device 220 may determine a lower-level session pointer position for the session pointer.

In some implementations, network device 220 may determine the lower-level session pointer position based on a life cycle value. For example, the life cycle value may indicate a remaining life cycle, and network device 220 may move the session pointer to a time bucket on the lower-level ager ring indicative of the remaining life cycle. Network device 220 may move the session pointer to the determined lower-level session pointer position of the lower-level ager ring. In this way, network device 220 may use multiple ager rings to monitor session expiration.

Although FIGS. 10A and 10B show example blocks of process 1000, in some implementations, process 1000 may include additional blocks, fewer blocks, different blocks, or differently arranged blocks than those depicted in FIGS. 10A and 10B. Additionally, or alternatively, two or more of the blocks of process 1000 may be performed in parallel.

FIGS. 11A-11D are diagrams of an example implementation 1100 relating to example process 1000 shown in FIGS. 10A and 10B. FIGS. 11A-11D show an example of updating an ager ring when an aging event is detected, and monitoring for session expiration. For the purpose of FIGS. 11A-11D, assume that the operations described herein in connection with FIG. 5, FIG. 7, and FIGS. 9A-9C have been performed.

Figure 11A:
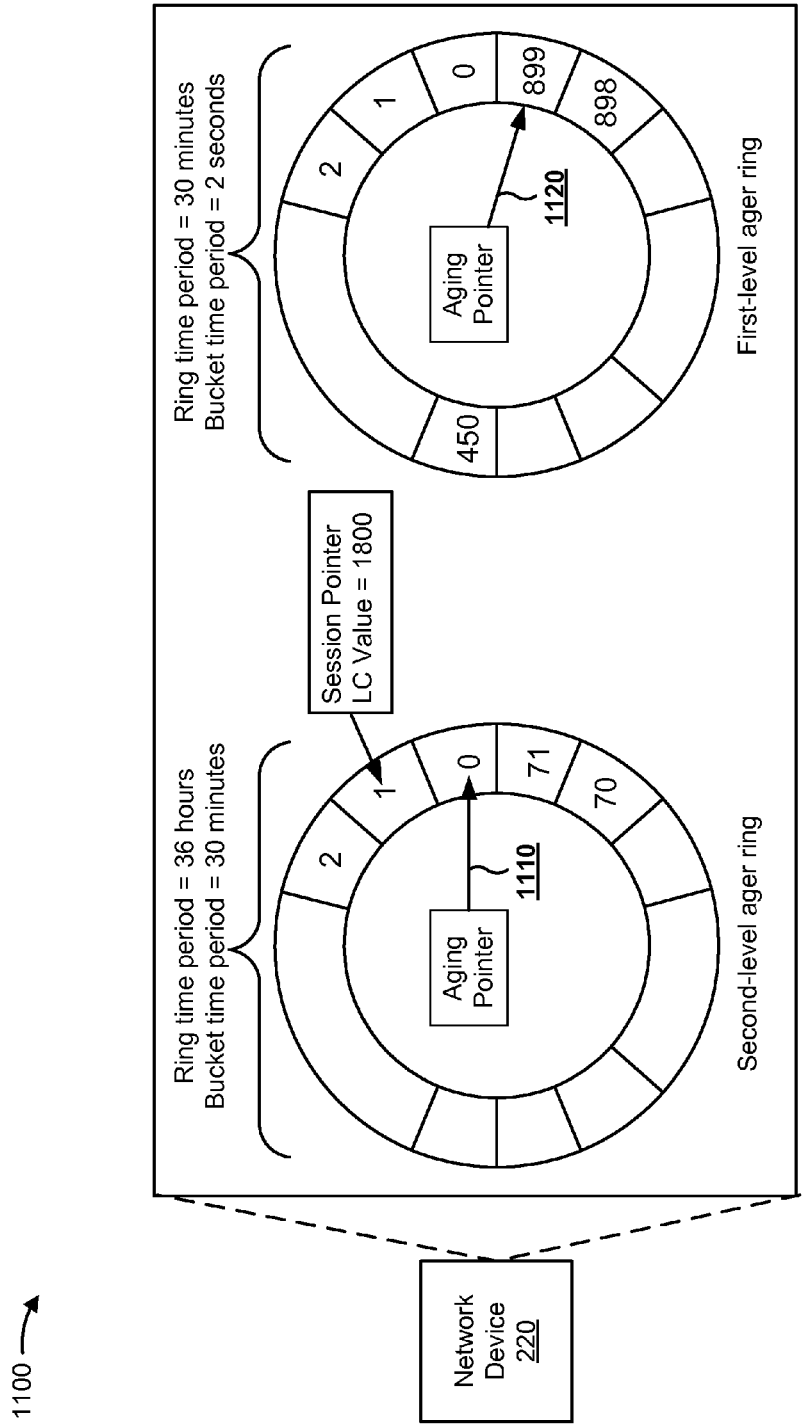
FIGS. 11A-11D are diagrams of an example implementation relating to the example process shown in FIG. 10.

As shown in FIG. 11A, and by reference number 1110, assume that a second-level aging pointer points to a first time bucket (e.g., time bucket zero) on a second-level ager ring. As shown by reference number 1120, assume that a first-level aging pointer has almost completely traversed the first-level ager ring (e.g., is one time bucket shy of a complete traversal).

Figure 11B:
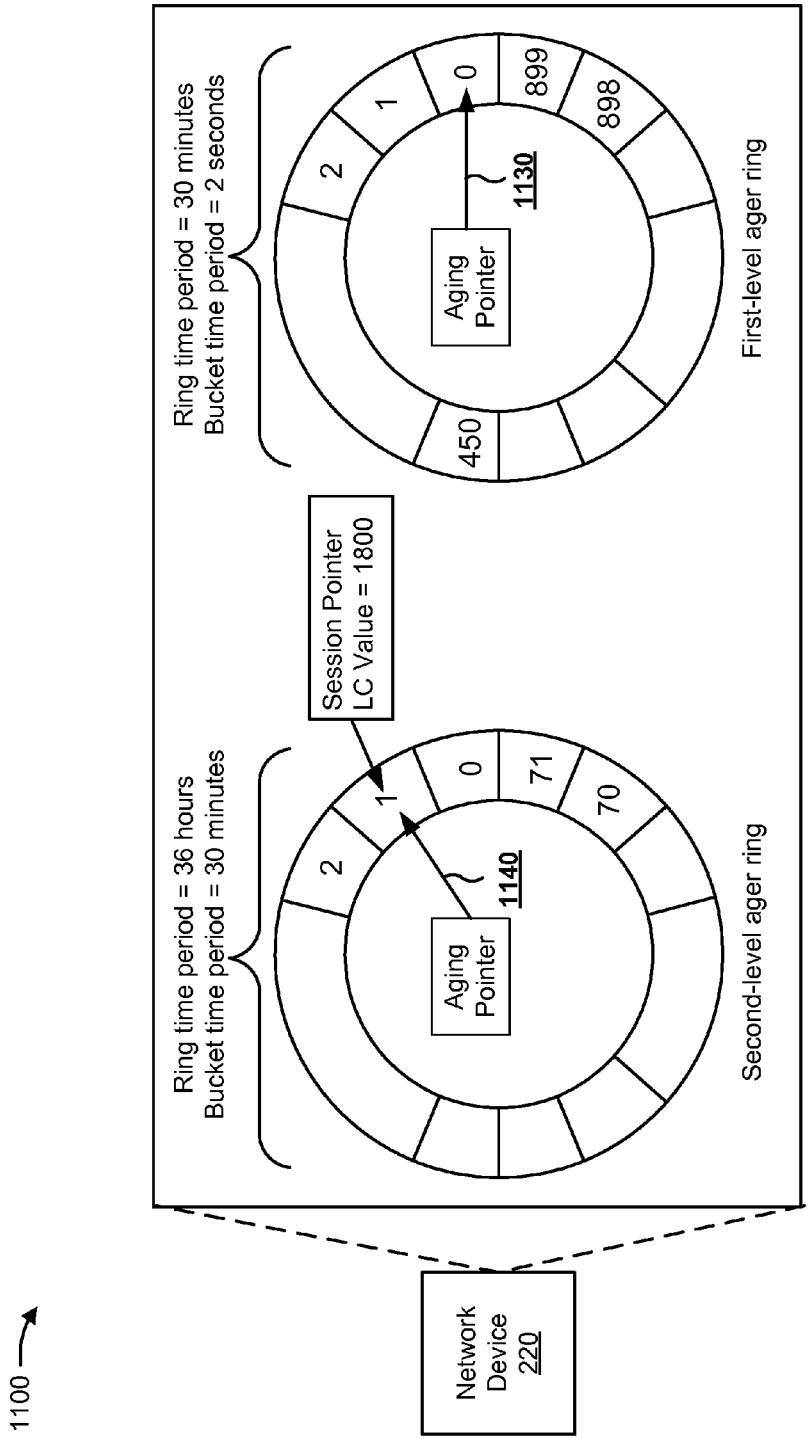

As shown in FIG. 11B, and by reference number 1130, assume that the first-level aging pointer completes a traversal of the first-level ager ring (e.g., moves from time bucket 899 to time bucket zero), indicating that 30 minutes have passed. Based on this traversal, assume that network device 220 updates a second-level aging pointer for the second-level ager ring to move from time bucket zero to time bucket one, as shown by reference number 1140.

Figure 11C:
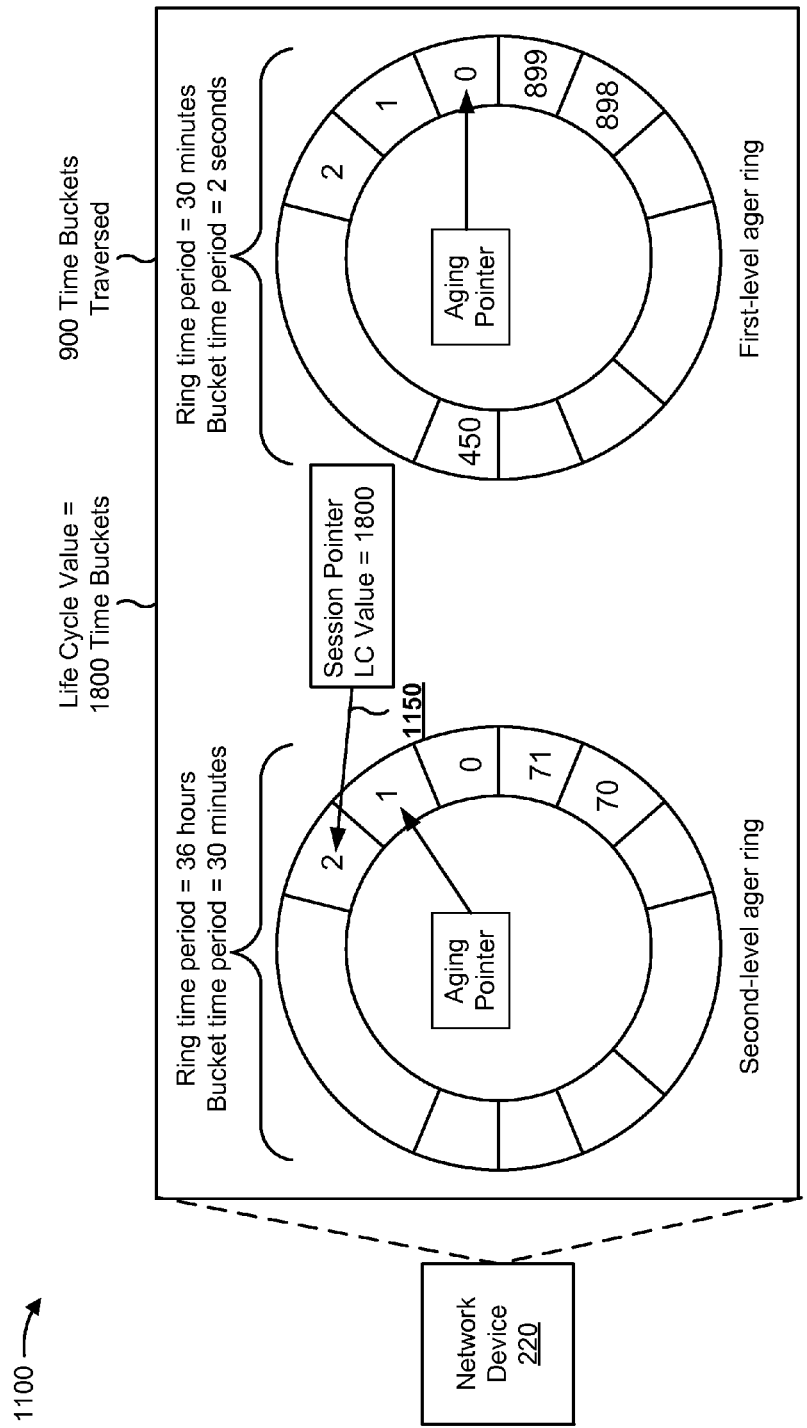

As shown in FIG. 11C, assume that network device 220 determines that 900 time buckets have been traversed (e.g., 1800 seconds have elapsed) since the last session event occurred. As further shown, assume that the life cycle value indicates a life cycle of 1800 time buckets (e.g., 3600 seconds) for the session. Thus, assume that network device 220 determines that the session has not expired, and moves the session pointer to time bucket two, as shown by reference number 1150. This indicates that 900 more time buckets must be traversed (e.g., 1800 more seconds must elapse) without a session event before network device 220 terminates the session.

Figure 11D:
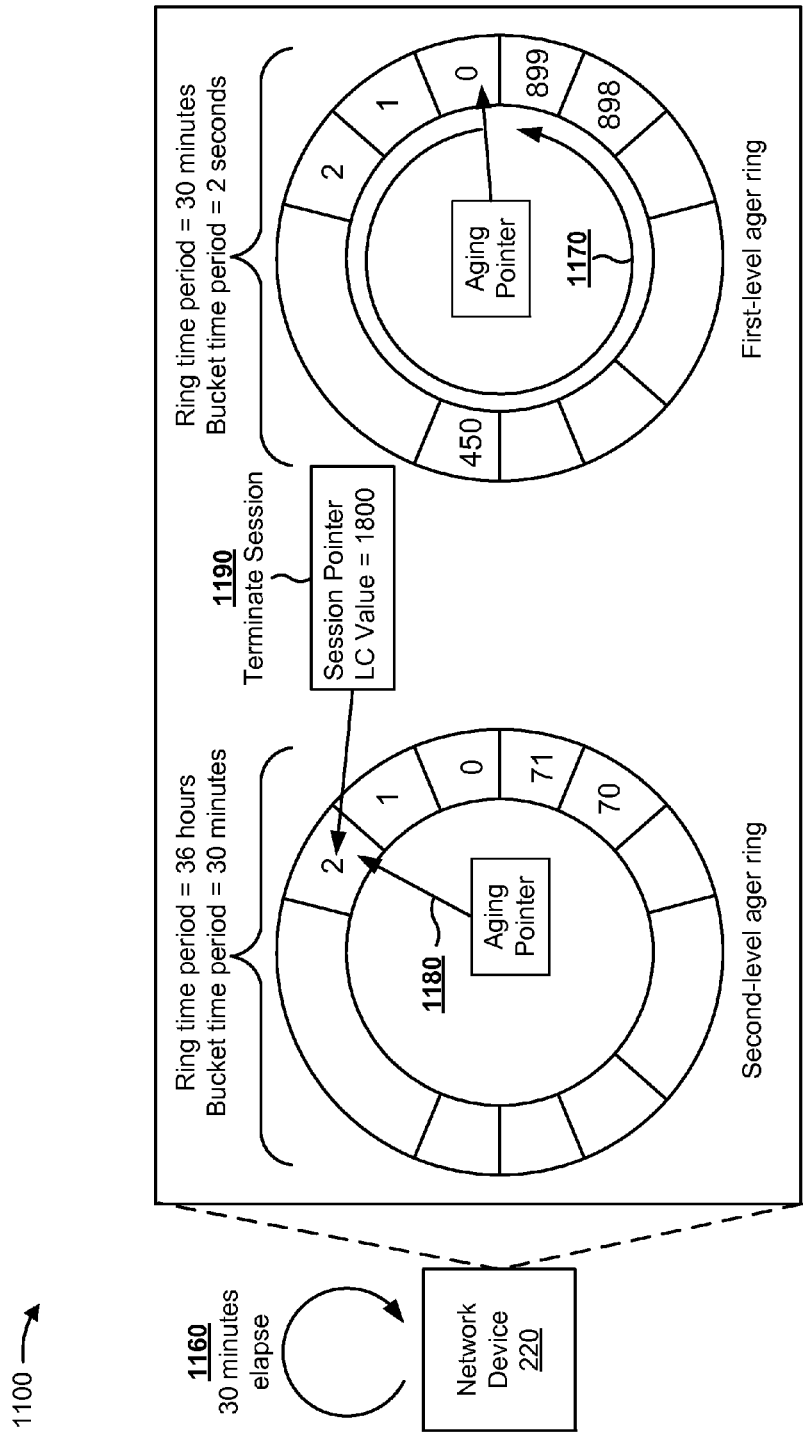

As shown in FIG. 11D, and by reference number 1160, assume that an additional 30 minutes elapse after network device 220 moves the session pointer to time bucket two. In other words, assume that that first-level aging pointer has completed another traversal of the first-level ager ring, as shown by reference number 1170. Based on this traversal, assume that network device 220 updates the second-level aging pointer, on the second-level ager ring, from time bucket one to time bucket two, as shown by reference number 1180.

Further, assume that the life cycle value still indicates a life cycle of 1800 time buckets, and network device 220 determines that 1800 time buckets have been traversed. Thus, assume that network device 220 terminates the session, as shown by reference number 1190. In this way, network device 220 may use multiple ager rings to monitor session expiration.

As indicated above, FIGS. 11A-11D are provided merely as an example. Other examples are possible and may differ from what was described with regard to FIGS. 11A-11D.

FIGS. 12A-12D are diagrams of another example implementation 1200 relating to example process 1000 shown in FIGS. 10A and 10B. FIGS. 12A-12D show an example of updating an ager ring when an aging event is detected, and monitoring for session expiration.

Figure 12A:
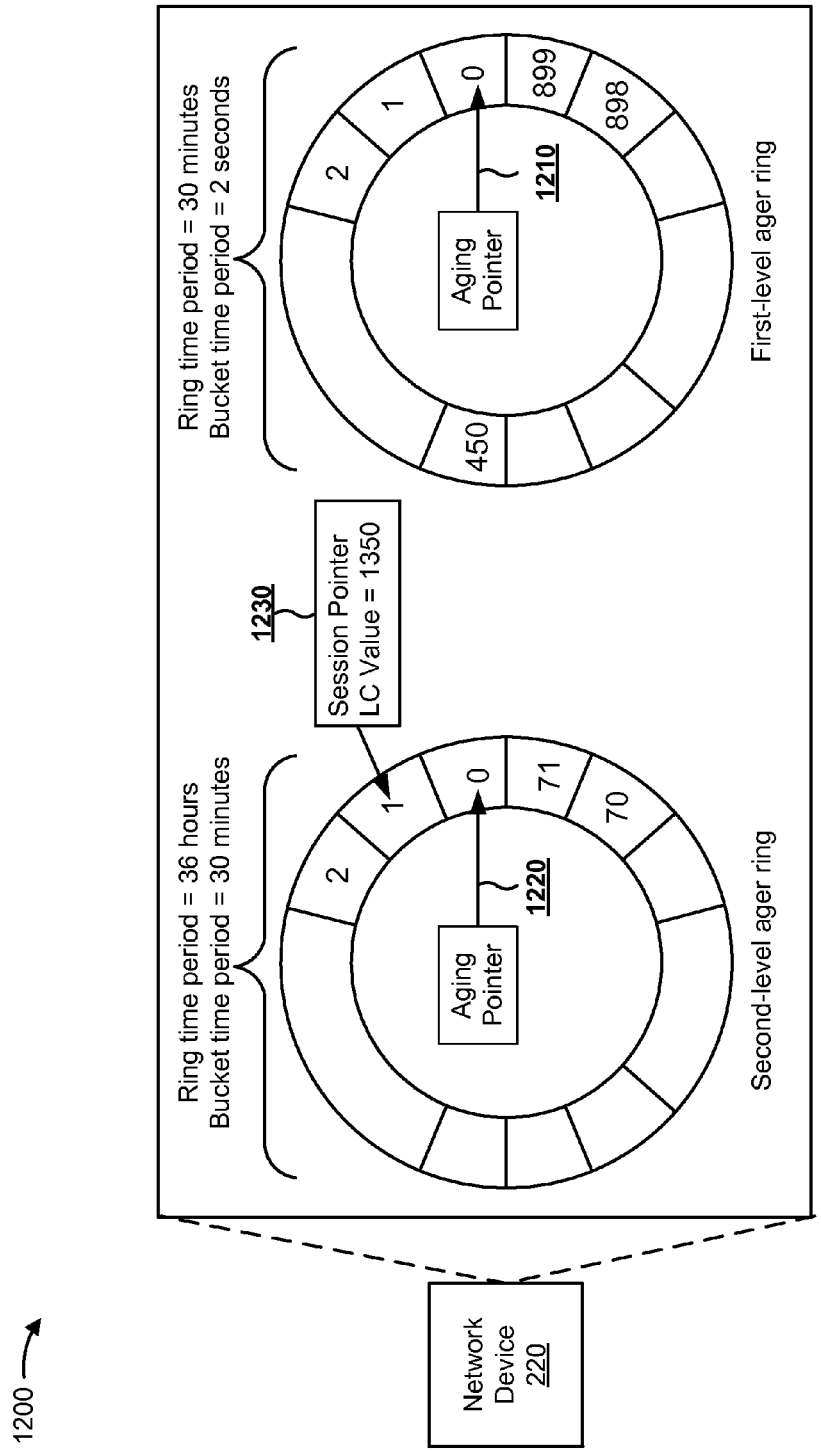
FIGS. 12A-12D are diagrams of another example implementation relating to the example process shown in FIG. 10.

As shown in FIG. 12A, and by reference number 1210, assume that network device 220 initializes a first-level aging pointer to point to a first time bucket (e.g., time bucket zero) on a first-level ager ring. As shown by reference number 1220, assume that network device 220 initializes a second-level aging pointer to point to a first time bucket (e.g., time bucket zero) on a second-level ager ring. Further, assume that network device 220 initializes a session pointer, on the second-level ager ring, to point to a second time bucket (e.g., time bucket one) on the second-level ager ring, as shown by reference number 1230. As further shown, assume that network device 220 initializes a life cycle value of 1350, and associates the life cycle value with the session pointer (e.g., indicating a life cycle of 1350 time buckets, or 2700 seconds, or 45 minutes).

Figure 12B:
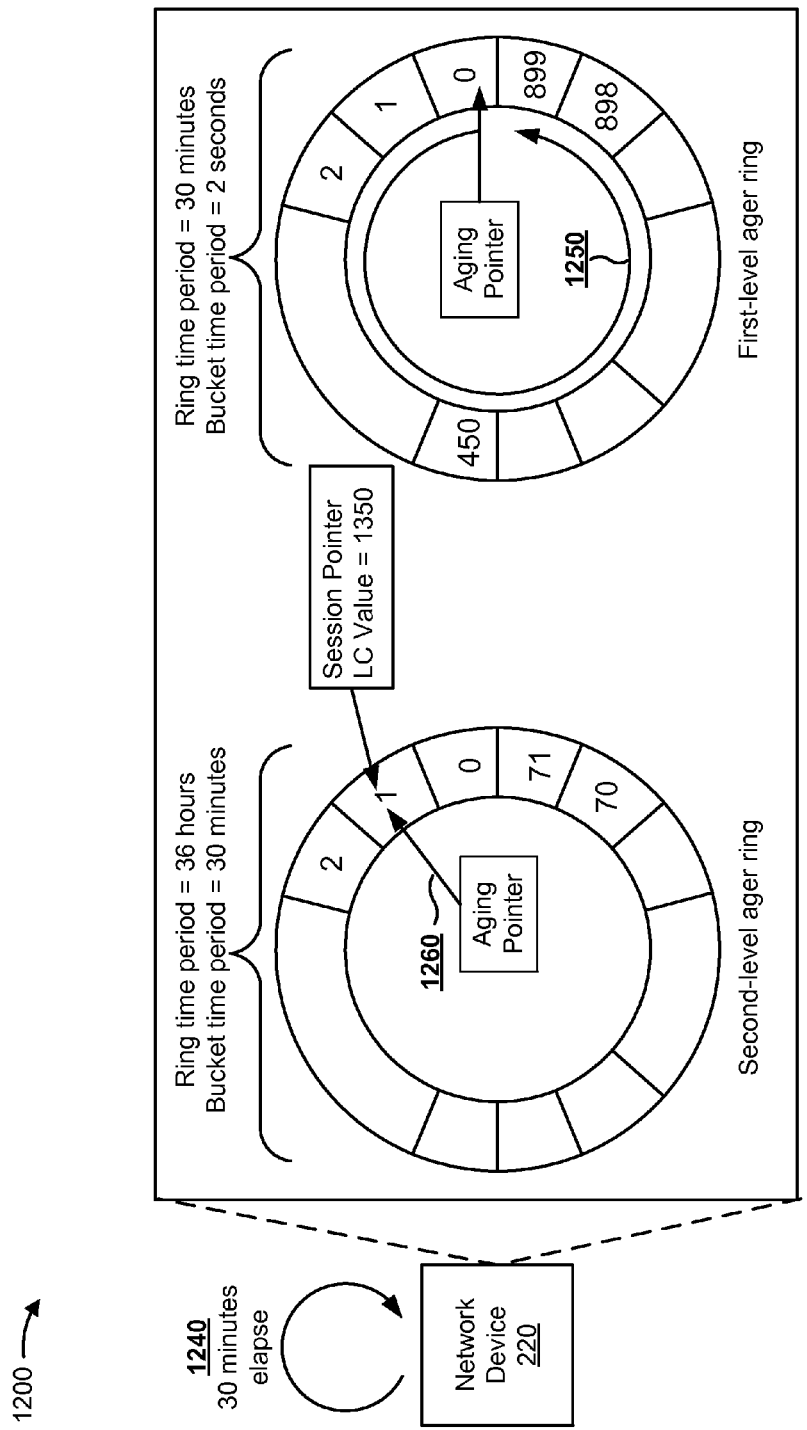

As shown in FIG. 12B, and by reference number 1240, assume that 30 minutes elapse without a session event occurring. Based on this time elapsing, assume that network device 220 periodically updates an aging pointer position of the first-level aging pointer until a complete traversal of the first-level ager ring occurs, as shown by reference number 1250. Based on this traversal, assume that network device 220 increments a time bucket of the second-level aging pointer, as shown by reference number 1260. Assume that the second-level aging pointer and the session pointer both point to time bucket one, as shown.

Figure 12C:
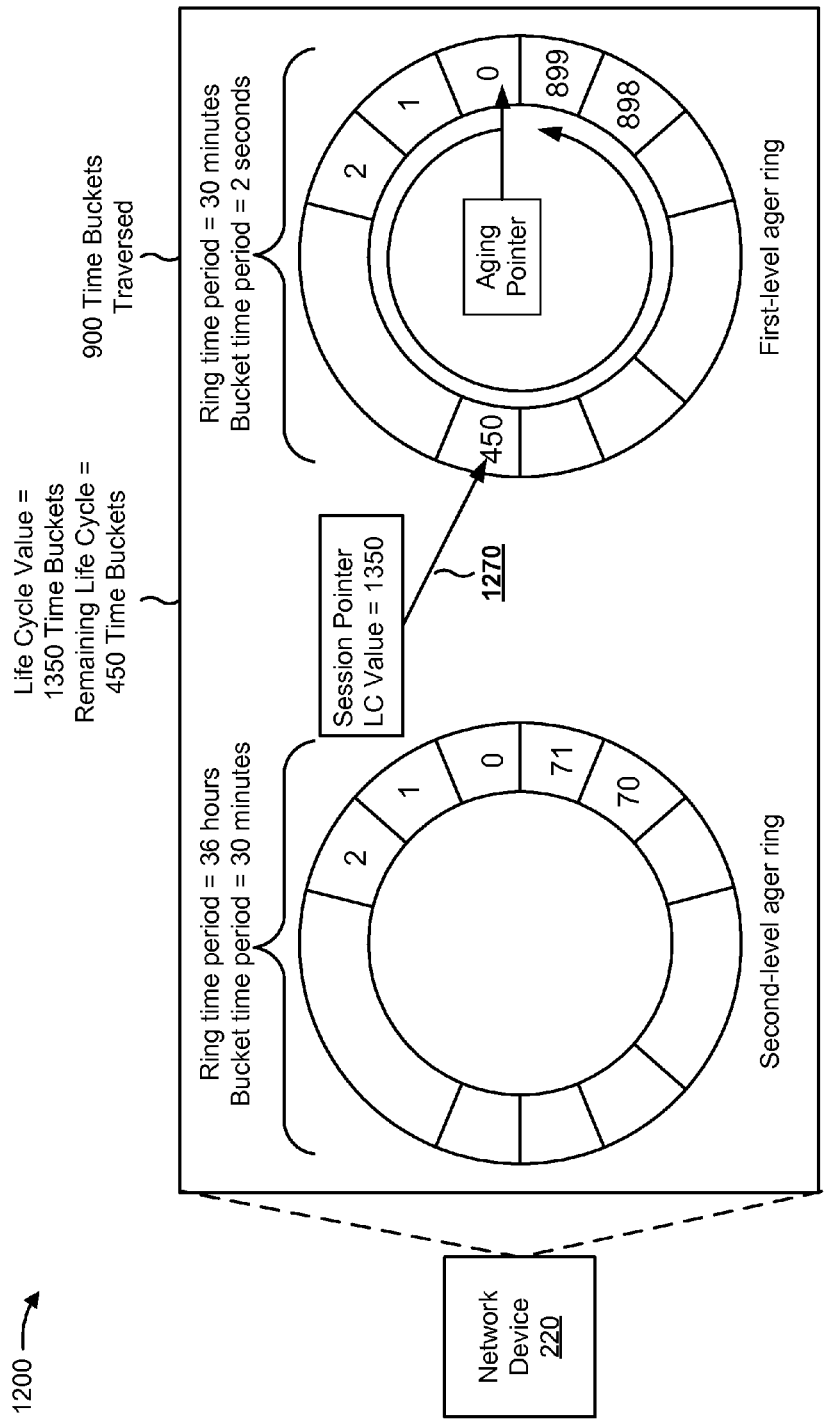

As shown in FIG. 12C, assume that network device 220 determines that 900 time buckets have been traversed (e.g., 1800 seconds have elapsed) since the last session event occurred. As further shown, assume that the life cycle value indicates a life cycle of 1350 time buckets (e.g., 2700 seconds) for the session. Further, assume that network device 220 determines that the session has not expired, and calculates a remaining life cycle of 450 time buckets for the session (e.g., 1350 time buckets-900 time buckets). Based on determining the remaining life cycle of 450 time buckets (e.g., 900 seconds), assume that network device 220 moves the session pointer to time bucket 450 of the first-level ager ring, as shown by reference number 1270. This indicates that 450 more time buckets must be traversed (e.g., 900 more seconds, or 15 more minutes, must elapse) without a session event before network device 220 terminates the session. As further shown, network device 220 may remove the second-level aging pointer, in some implementations, since the second-level aging pointer is no longer needed to measure the passage of time.

Figure 12D:
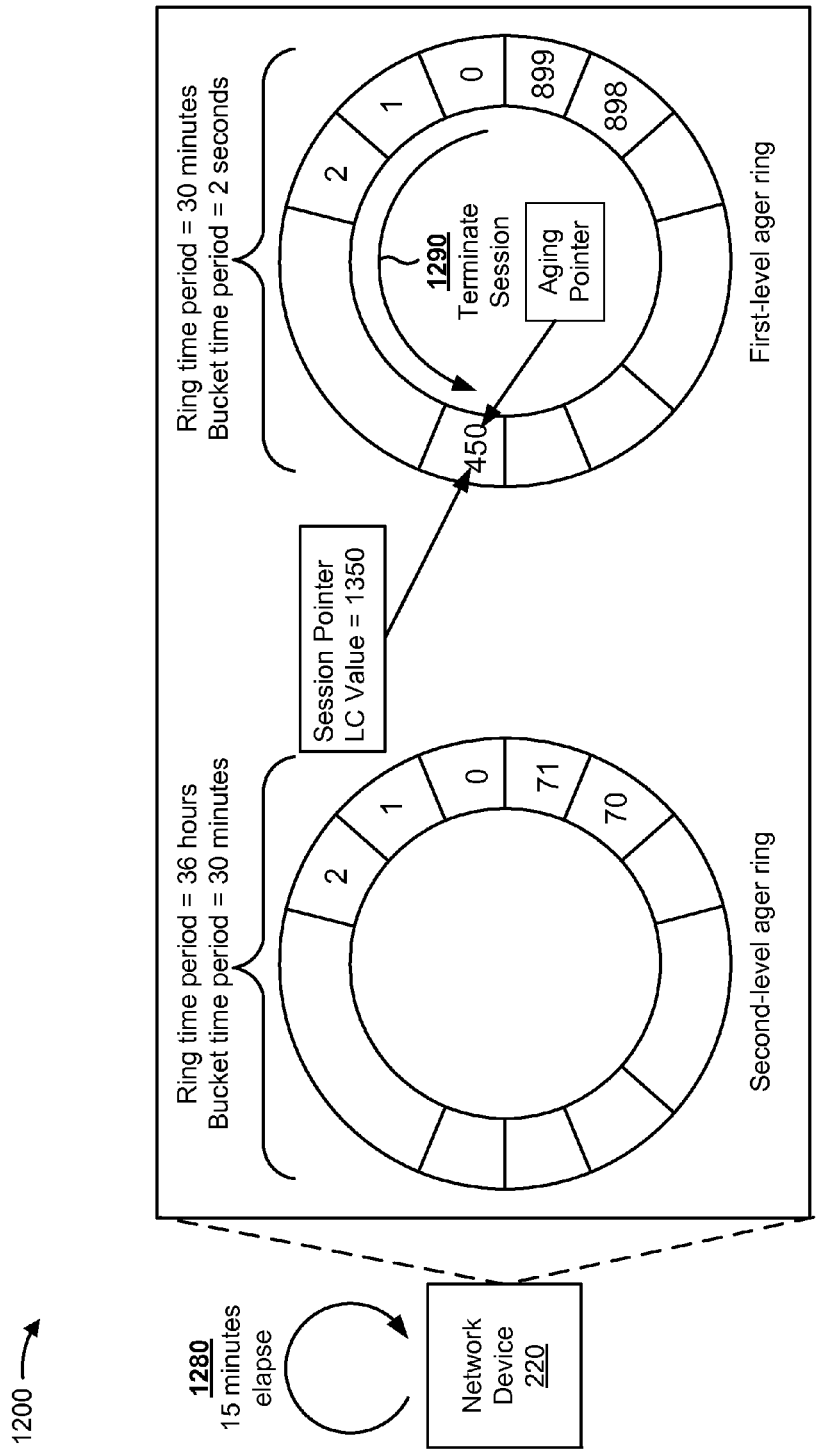

As shown in FIG. 12D, and by reference number 1280, assume that an additional 15 minutes elapse after network device 220 moves the session pointer to time bucket 450. Thus, assume that that first-level aging pointer has traversed 450 time buckets, and points to time bucket 450, as shown by reference number 1290. Because the first-level aging pointer and the session pointer point to the same time bucket on the first-level ager ring, assume that network device 220 terminates the session. In this way, network device 220 may use multiple ager rings to monitor session expiration.

As indicated above, FIGS. 12A-12D are provided merely as an example. Other examples are possible and may differ from what was described with regard to FIGS. 12A-12D.

Implementations described herein conserve computing resources by using ager rings of different sizes (e.g., multi-level ager rings) for sessions with different life cycles.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      detect a communication session;
      determine a session life cycle associated with the communication session,
         the session life cycle indicating a time period after which the communication session is to be terminated;
      determine whether the session life cycle satisfies a threshold; and
      selectively perform a first action or a second action based on determining whether the session life cycle satisfies the threshold,
         the first action including monitoring expiration of the communication session using a single ager ring when the session life cycle does not satisfy the threshold,
         the second action including monitoring expiration of the communication session using a plurality of ager rings when the session life cycle satisfies the threshold.

2. The device of claim 1, where the one or more processors, when determining whether the session life cycle satisfies the threshold, are further to:
   determine whether the session life cycle is greater than a ring time period associated with a lower-level ager ring included in the plurality of ager rings,
      the ring time period indicating an amount of time to traverse the lower-level ager ring; and
   where the one or more processors, when selectively performing the first action or the second action, are further to:
      selectively perform the first action or the second action based on determining whether the session life cycle is greater than the ring time period,
         the first action including monitoring the expiration of the communication session using the lower-level ager ring when the session life cycle is not greater than the ring time period,
         the second action including monitoring the expiration of the communication session using the lower-level ager ring and a higher-level ager ring, included in the plurality of ager rings, when the session life cycle is greater than the ring time period.

3. The device of claim 1,
   where the one or more processors, when determining whether the session life cycle satisfies the threshold, are further to:
      determine that the session life cycle satisfies the threshold;
   where the one or more processors, when selectively performing the first action or the second action, are further to:
      perform the second action based on determining that the session life cycle satisfies the threshold;
      determine a quantity of ager rings, to be used to monitor the expiration of the communication session, based on comparing the session life cycle to at least one threshold, including the threshold; and
      monitor the expiration of the communication session using the determined quantity of ager rings,
         the determined quantity of ager rings including at least two ager rings.

4. The device of claim 1,
   where the one or more processors, when determining whether the session life cycle satisfies the threshold, are further to:
      determine that the session life cycle satisfies the threshold;
   where the one or more processors, when selectively performing the first action or the second action, are further to:
      perform the second action based on determining that the session life cycle satisfies the threshold;
      initialize a first aging pointer for a first ager ring of the plurality of ager rings,
         the first aging pointer being used to measure passage of a first time period; and initialize a second aging pointer for a second ager ring of the plurality of ager rings,
the second aging pointer being used to measure passage of a second time period that is different from the first time period.

5. The device of claim 1,
where the one or more processors, when determining whether the session life cycle satisfies the threshold, are further to:
determine that the session life cycle satisfies the threshold;
where the one or more processors, when selectively performing the first action or the second action, are further to:
perform the second action based on determining that the session life cycle satisfies the threshold;
initialize a first aging pointer for a first ager ring of the plurality of ager rings,
the first aging pointer being used to measure passage of a first time period;
initialize a second aging pointer for a second ager ring of the plurality of ager rings,
the second aging pointer being used to measure passage of a second time period that is greater than the first time period; and
initialize a session pointer for the second ager ring,
the session pointer being used to indicate the expiration of the communication session.

6. The device of claim 1, where the one or more processors are further to:
calculate a life cycle value indicative of the session life cycle;
initialize a session pointer,
the session pointer being used to indicate the expiration of the communication session; and
store an association between the life cycle value and the session pointer.

7. The device of claim 1, where the one or more processors are further to:
monitor the communication session using the single ager ring or the plurality of ager rings;
determine, based on the session life cycle, that the communication session has expired; and
terminate the communication session based on determining that the communication session has expired.

8. A computer-readable medium storing instructions, the instructions comprising:
one or more instructions that, when executed by one or more processors, cause the one or more processors to:
determine a session life cycle associated with a communication session,
the session life cycle indicating a time period associated with expiration of the communication session;
compare the session life cycle and a threshold value;
determine that the session life cycle satisfies the threshold value based on comparing the session life cycle and the threshold value;
initialize a plurality of ager rings based on determining that the session life cycle satisfies the threshold value,
the plurality of ager rings being used to monitor the expiration of the communication session; and
monitor the expiration of the communication session using the plurality of ager rings.

9. The computer-readable medium of claim 8, where the one or more instructions, that cause the one or more processors to initialize the plurality of ager rings, further cause the one or more processors to:
initialize a lower-level ager ring of the plurality of ager rings,
the lower-level ager ring including a plurality of first time buckets used to measure passage of a first time period;
initialize a higher-level ager ring of the plurality of ager rings,
the higher-level ager ring including a plurality of second time buckets used to measure passage of a second time period,
the second time period being greater than the first time period.

10. The computer-readable medium of claim 8, where the one or more instructions, that cause the one or more processors to initialize the plurality of ager rings, further cause the one or more processors to:
initialize a lower-level ager ring of the plurality of ager rings,
the lower-level ager ring representing a first time period;
initialize a higher-level ager ring of the plurality of ager rings,
the higher-level ager ring including a plurality of time buckets, each used to measure passage of a second time period,
the second time period being equal to the first time period.

11. The computer-readable medium of claim 8, where the one or more instructions, when executed by the one or more processors, further cause the one or more processors to:
initialize a session pointer for a first time bucket of a plurality of first time buckets associated with a first ager ring of the plurality of ager rings,
the session pointer indicating a time point associated with the expiration of the communication session,
the first ager ring being a higher-level ager ring than a second ager ring of the plurality of ager rings;
detect a session event associated with the communication session;
determine, based on detecting the session event, a different time bucket to which the session pointer is to be moved; and
move the session pointer to the different time bucket.

12. The computer-readable medium of claim 11, where the one or more instructions, when executed by the one or more processors, further cause the one or more processors to:
initialize an aging pointer for a second time bucket of a plurality of second time buckets associated with the second ager ring,
the aging pointer being used to measure passage of time; and
where the one or more instructions, that cause the one or more processors to determine the different time bucket, further cause the one or more processors to:
determine the different time bucket based on a position of the aging pointer when the session event is detected.

13. The computer-readable medium of claim 8, where the one or more instructions, when executed by the one or more processors, further cause the one or more processors to:
initialize a life cycle value indicative of the session life cycle;
detect a session event associated with the communication session; and
update the life cycle value based on detecting the session event.

14. The computer-readable medium of claim 8, where the one or more instructions, when executed by the one or more processors, further cause the one or more processors to:
- initialize a lower-level aging pointer for a lower-level time bucket associated with a lower-level ager ring of the plurality of ager rings,
  - the lower-level aging pointer being used to measure passage of time;
- initialize a higher-level aging pointer for a first higher-level time bucket associated with a higher-level ager ring of the plurality of ager rings,
  - the higher-level aging pointer being used to measure passage of time;
- initialize a session pointer for a second higher-level time bucket associated with the higher-level ager ring,
  - the session pointer indicating a time associated with the expiration of the communication session;
- determine that the lower-level aging pointer indicates that a threshold amount of time has elapsed;
- move the higher-level aging pointer to the second higher-level time bucket based on determining that the lower-level aging pointer indicates that the threshold amount of time has elapsed;
- determine that the higher-level aging pointer and the session pointer are both positioned on the second higher-level time bucket; and
- terminate the communication session based on determining that the higher-level aging pointer and the session pointer are both positioned on the second higher-level time bucket.

15. A method, comprising:
- determining, by a device, a session life cycle associated with a communication session,
  - the session life cycle identifying a session time period associated with expiration of the communication session;
- comparing, by the device, the session time period and a threshold time period associated with a lower-level ager ring,
  - the lower-level ager ring being used to monitor the expiration of the communication session;
- determining, by the device, that the session time period satisfies the threshold time period based on comparing the session time period and the threshold time period;
- initializing, by the device, a plurality of ager rings based on determining that the session time period satisfies the threshold time period,
  - the plurality of ager rings including the lower-level ager ring and a higher-level ager ring; and
- monitoring, by the device, the expiration of the communication session using the plurality of ager rings.

16. The method of claim 15, where initializing the plurality of ager rings further comprises:
- initializing a lower-level aging pointer associated with the lower-level ager ring,
  - the lower-level aging pointer being used to measure passage of time;
- initializing a higher-level aging pointer associated with the higher-level ager ring,
  - the higher-level aging pointer being used to measure passage of time; and
- where monitoring the expiration of the communication session further comprises:
  - determining that the lower-level aging pointer indicates that the threshold time period has elapsed; and
  - updating the higher-level aging pointer based on determining that the lower-level aging pointer indicates that the threshold time period has elapsed.

17. The method of claim 15, where the threshold time period represents a time period for an aging pointer to traverse the lower-level ager ring.

18. The method of claim 15, where initializing the plurality of ager rings further comprises:
- initializing a higher-level aging pointer associated with the higher-level ager ring,
  - the higher-level aging pointer being used to measure passage of time;
- initializing a session pointer for the higher-level ager ring,
  - the session pointer indicating a time associated with the expiration of the communication session; and
- where monitoring the expiration of the communication session further comprises:
  - determining that the higher-level aging pointer and the session pointer point to a same time bucket on the higher-level ager ring;
  - determining a remaining life cycle associated with the communication session based on determining that the higher-level aging pointer and the session pointer point to the same time bucket; and
  - moving the session pointer to a different time bucket based on the remaining life cycle.

19. The method of claim 18, further comprising:
- determining whether the remaining life cycle satisfies a threshold associated with the threshold time period; and
- where moving the session pointer to the different time bucket further comprises:
  - moving the session pointer to a lower-level time bucket, on the lower-level ager ring, or a higher-level time bucket, on the higher-level ager ring, based on determining whether the remaining life cycle satisfies the threshold,
    - the session pointer being moved to the lower-level time bucket when the remaining life cycle does not satisfy the threshold,
    - the session pointer being moved to the higher-level time bucket when the remaining life cycle satisfies the threshold.

20. The method of claim 15, where initializing the plurality of ager rings further comprises:
- initializing an aging pointer associated with the higher-level ager ring,
  - the aging pointer being used to measure passage of time;
- initializing a session pointer for the higher-level ager ring,
  - the session pointer indicating a time associated with the expiration of the communication session; and
- where monitoring the expiration of the communication session further comprises:
  - determining that the aging pointer and the session pointer point to a same time bucket on the higher-level ager ring; and
  - terminating the communication session based on determining that the aging pointer and the session pointer point to the same time bucket.

* * * * *